(12) United States Patent
Okazaki

(10) Patent No.: US 10,744,565 B2
(45) Date of Patent: Aug. 18, 2020

(54) THREE DIMENSIONAL PRINTER

(71) Applicant: Sodick Co., Ltd., Kanagawa (JP)

(72) Inventor: Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 16/170,385

(22) Filed: Oct. 25, 2018

(65) Prior Publication Data

US 2019/0151945 A1 May 23, 2019

(30) Foreign Application Priority Data

Nov. 17, 2017 (JP) ................................. 2017-221731

(51) Int. Cl.
| | |
|---|---|
| *B29C 67/00* | (2017.01) |
| *B22F 3/105* | (2006.01) |
| *B22F 3/10* | (2006.01) |
| *B33Y 30/00* | (2015.01) |
| *B29C 64/153* | (2017.01) |

(52) U.S. Cl.
CPC .......... *B22F 3/1055* (2013.01); *B22F 3/1007* (2013.01); *B29C 64/153* (2017.08); *B33Y 30/00* (2014.12); *B22F 2003/1056* (2013.01); *B22F 2201/10* (2013.01)

(58) Field of Classification Search
CPC ......... B33Y 10/00; B33Y 30/00; B29C 64/20; B29C 64/264
See application file for complete search history.

(56) References Cited

U.S. PATENT DOCUMENTS

| | | |
|---|---|---|
| 9,138,807 B1 | 9/2015 | Takezawa et al. |
| 9,604,410 B2 | 3/2017 | Okazaki et al. |
| | (Continued) | |

FOREIGN PATENT DOCUMENTS

| | | |
|---|---|---|
| DE | 10 2013 011 676 A1 | 1/2015 |
| JP | 2014-125643 A | 7/2014 |
| | (Continued) | |

OTHER PUBLICATIONS

Japanese Office Action dated Jun. 12, 2018 of corresponding application No. 2017-221731; 7 pgs.
(Continued)

*Primary Examiner* — Joseph S Del Sole
*Assistant Examiner* — Thu Khanh T Nguyen
(74) *Attorney, Agent, or Firm* — Maier & Maier, PLLC

(57) ABSTRACT

A lamination molding apparatus with a molding table, including: a galvanometer scanner configured to irradiate a small irradiation region on the molding table with a laser beam; an inert gas supplying nozzle having an inert gas supplying opening for supplying an inert gas; a fume suction duct having a fume suction opening for suctioning the inert gas containing fumes generated with irradiation of the laser beam; an integration unit integrally including the galvanometer scanner, the inert gas supplying nozzle and the fume suction duct; and a moving device configured to move the integration unit so the galvanometer scanner scans and irradiates the laser beam on a large irradiation region larger than the small irradiation region on the molding table; wherein the inert gas supplying opening and the fume suction opening are opposed to each other so an irradiation path of the laser beam is placed therebetween.

9 Claims, 24 Drawing Sheets

(56) References Cited

U.S. PATENT DOCUMENTS

| | | | |
|---|---|---|---|
| 9,731,450 B2 | 8/2017 | Echigo et al. | |
| 9,878,497 B2 | 1/2018 | Schwarze et al. | |
| 2003/0028278 A1* | 2/2003 | Darrah | B33Y 40/00 700/119 |
| 2010/0007062 A1* | 1/2010 | Larsson | B29C 64/153 264/485 |
| 2015/0183165 A1* | 7/2015 | Abe | B22F 3/105 264/497 |
| 2016/0096325 A1* | 4/2016 | Araie | B29C 64/153 |
| 2016/0114427 A1 | 4/2016 | Eibl et al. | |
| 2017/0297110 A1 | 10/2017 | Echigo et al. | |

FOREIGN PATENT DOCUMENTS

| | | |
|---|---|---|
| JP | 2015-128898 A | 7/2015 |
| JP | 2015-199195 A | 11/2015 |
| JP | 2016-006214 A | 1/2016 |
| JP | 2017-203199 A | 11/2017 |

OTHER PUBLICATIONS

Office Action dated Apr. 21, 2020 in corresponding German Application No. 10 2018 128 543.4; 9 pages including English language translation.

* cited by examiner

THREE DIMENSIONAL PRINTER

FIELD

The present invention relates to a lamination molding apparatus.

BACKGROUND

In a lamination molding method using laser beam, a molding table capable of vertical movement is arranged in a chamber filled with inert gas. Then, a very thin material powder layer is formed on the molding table. Next, predetermined portions of this material powder layer are irradiated with the laser beam to sinter the material powder at the position of irradiation, thereby forming a sintered layer. These procedures are repeated to form a desired three-dimensional shape composed of a sintered body integrally formed by laminating a plurality of sintered layers. This lamination molding method is realized by a lamination molding apparatus. These days, it is required to enlarge such a lamination molding apparatus so that a larger molded object can be formed.

In the conventional lamination molding apparatus disclosed in Patent Literature 1, the galvanometer scanner is disposed on the upper plate of the chamber right above the center of the molding table. A condensing lens is provided between the galvanometer scanner and the laser source, and a window is provided between the galvanometer scanner and the molding table. The galvanometer scanner has a pair of (two-axis) galvanometer mirrors and is configured to scan laser beams on the X and Y axes. If there is no interference with the frame of the window, there is no physical restriction in the irradiation region of the laser beam. However, as the irradiation angle of the laser beam with respect to the vertical axis increases, as the deformation of the shape of the irradiation spot increases, or as the irradiation energy varies, the accuracy of sintering the material powder uniformly decreases. Further, if the galvanometer scanner is disposed at a high position, the irradiation region with the laser beam can be expanded. However, the laser beam irradiated with a long irradiation distance at a large irradiation angle largely changes the position of irradiation spot with a slight change in the attachment position of the galvanometer scanner due to thermal deformation of the chamber. Actually, there is a problem that the maximum irradiation range is limited to a certain extent.

Further, the conventional lamination molding apparatus mainly supplies or discharges inert gas from the side wall and the top plate of the chamber, and removes fumes generated when the material powder is sintered by irradiation of the laser beam. Achieving the above object of enlarging the irradiation range, the distance between the irradiation spot and the inert gas supplying opening or the fume discharging opening becomes larger in the conventional lamination molding apparatus. Then, fume removal cannot be completed in time, when the laser beam is scanned with the scan speed and the irradiation energy calculated from the current standard molding time. As a result, it is impossible to maintain a clean environment to the extent that molding in the chamber is possible, which may hinder molding. In order to perform proper molding, it is necessary to slow down the scan speed sufficiently, to reduce the irradiation energy, and to remove fumes while intermittently providing a pause time in which the laser beam is not irradiated, so that a suitable environment is maintained. However, since the molding region becomes larger, the efficiency in molding is considerably lower, and there is a concern that the molding time becomes unacceptably long.

PATENT LITERATURE

PLT1: JP2016-006214A

SUMMARY

The present invention has been made by taking these circumstances into consideration. An object of the present invention is to provide a lamination molding apparatus which can mold a larger molded object.

According to the present invention, a lamination molding apparatus with a molding table, including: a galvanometer scanner configured to be capable of irradiating a predetermined small irradiation region on the molding table with a laser beam; an inert gas supplying nozzle having an inert gas supplying opening for supplying an inert gas; a fume suction duct having a fume suction opening for suctioning the inert gas containing fumes generated with irradiation of the laser beam; an integration unit integrally including the galvanometer scanner, the inert gas supplying nozzle and the fume suction duct; and a moving device configured to move the integration unit so that the galvanometer scanner scans and irradiates the laser beam on a predetermined large irradiation region larger than the predetermined small irradiation region on the molding table; wherein the inert gas supplying opening and the fume suction opening are provided to be opposed to each other so that an irradiation path of the laser beam is placed therebetween.

In the present invention, the galvanometer scanner, the inert gas supplying nozzle, and the fume suction duct are moved integrally, and the inert gas supplying opening of the inert gas supplying nozzle and the fume suction opening of the fume suction duct are provided to be opposed to each other so that an irradiation path of the laser beam is placed therebetween. With such configurations, it is possible to realize the flow of the inert gas near the irradiation position of the laser beam, resulting in the enlargement of the chamber, which was conventionally difficult, to produce large molding object.

DETAILED DESCRIPTION

Hereinafter, the embodiments of the present invention will be described with reference to the drawings. Here, the characteristic matters shown in the embodiments can be combined with each other.

1. Outline of the Apparatus

Figure 1:
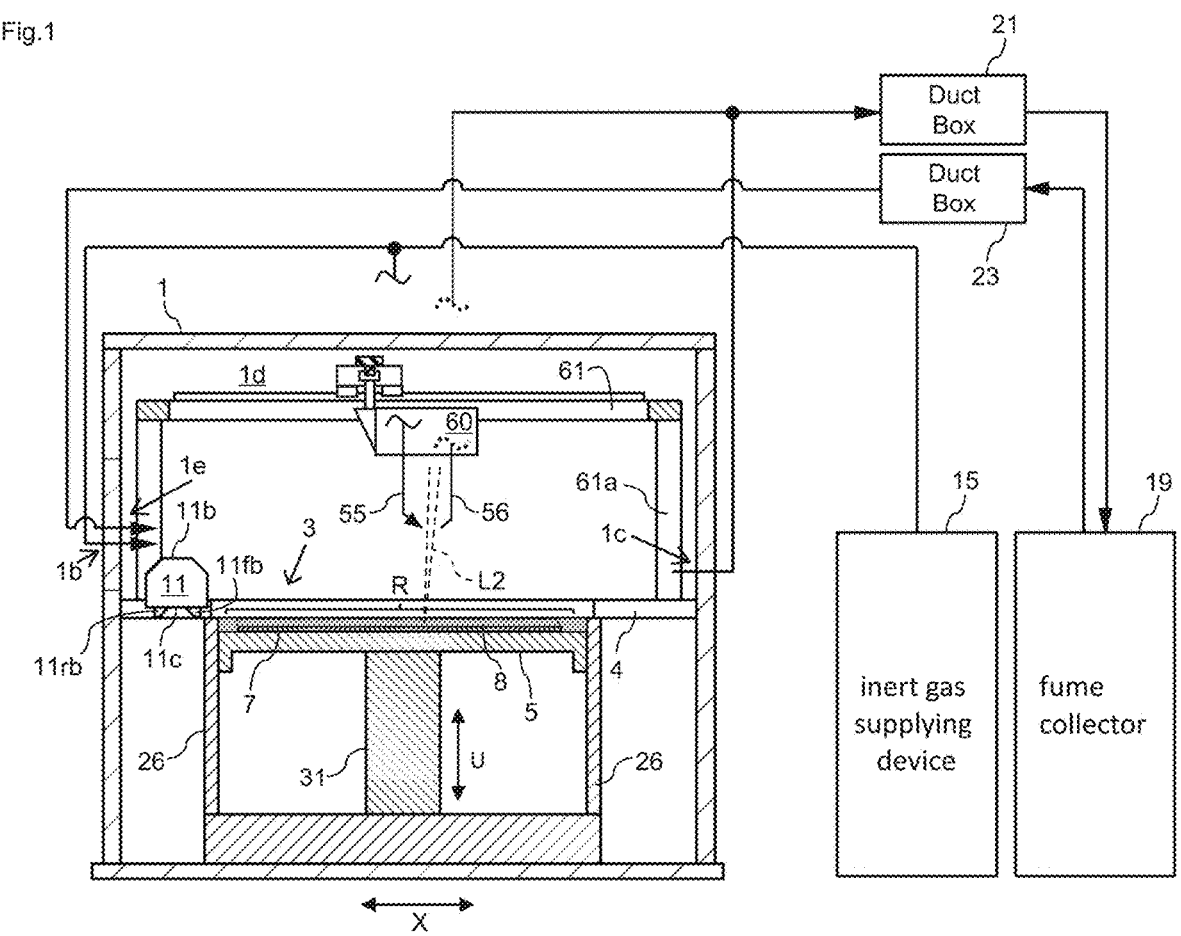
FIG. 1 is a schematic configuration diagram of a lamination molding apparatus according to an embodiment of the present invention.

First, a lamination molding apparatus according to an embodiment of the present invention will be described. FIG. 1 is a schematic configuration diagram of a lamination molding apparatus according to an embodiment of the present invention. As shown in FIG. 1, a lamination molding apparatus according to an embodiment of the present invention is provided with a powder layer forming apparatus 3 in a chamber 1 filled with inert gas.

The powder layer forming apparatus 3 includes a base table 4 having a molding region R and a recoater head 11 arranged on the base table 4 and configured to be movable in a horizontal one axis direction (direction of arrow X). The molding table 5 which is movable in the vertical direction (direction of arrow U in FIG. 1) is provided in the molding region R. Using the lamination molding apparatus, the molding plate 7 is placed on the molding table 5, and the material powder layer 8 is formed thereon. Also, the predetermined irradiation region exists within the molding region R, and roughly matches the region surrounded by the contour shape of the desired three-dimensional molded object.

The powder retaining wall 26 is provided around the molding table 5. Unsintered material powder is retained in the powder retaining space formed by the powder retaining wall 26 and the molding table 5. Although not shown in FIG. 1, a powder discharging section capable of discharging the material powder in the powder retaining space may be provided under the powder retaining wall 26. In this case, unsintered material powder is discharged from the powder discharging section by lowering the molding table 5 after completing the lamination molding. The discharged material powder is guided to the chute by the chute guide and is accommodated in the bucket through the chute.

Figure 2:
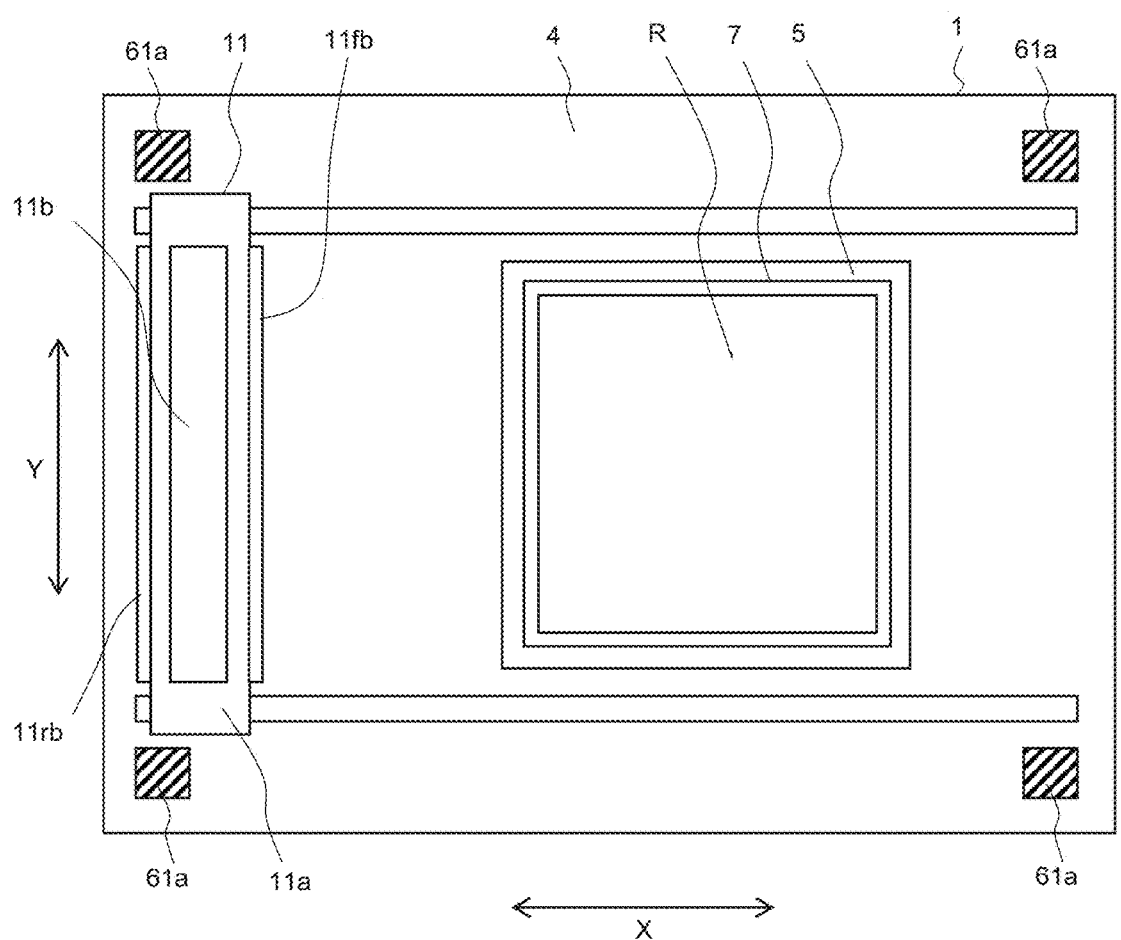
FIG. 2 is a schematic diagram of the recoater head 11 according to an embodiment of the present invention.

As shown in FIG. 2, the recoater head 11 is guided in the direction of arrow X by a guide member such as a guide rail and a guide block, and moves in the direction of the arrow X by a driving device (not shown). As shown in FIGS. 1 and 2, the recoater head 11 has the material holding section 11a, and the material supplying section 11b, and the material discharging section 11c.

The material holding section 11a accommodates the material powder. The material powder is, for example, metal powder (e.g. iron powder), and is, for example, a spherical shape having an average particle diameter of 20 μm. The material supplying section 11b is provided on the upper surface of the material holding section 11a, and serves as a receptacle for material powder, which is supplied from a material supplying device (not shown) to the material holding section 11a. The material discharging section 11c is provided on the bottom surface of the material holding section 11a, and discharges material powder in the material holding section 11a. The material discharging section 11c has a slit shape extending in a horizontal one-axis direction (direction of arrow Y), which is orthogonal to the moving direction (direction of arrow X) of the recoater head 11.

The blades 11fb and 11rb are provided on both sides of the recoater head 11. The blades 11fb and 11rb planarize the material powder discharged from the material discharging section 11c to form the material powder layer 8.

2. Integration Unit

Figure 3:
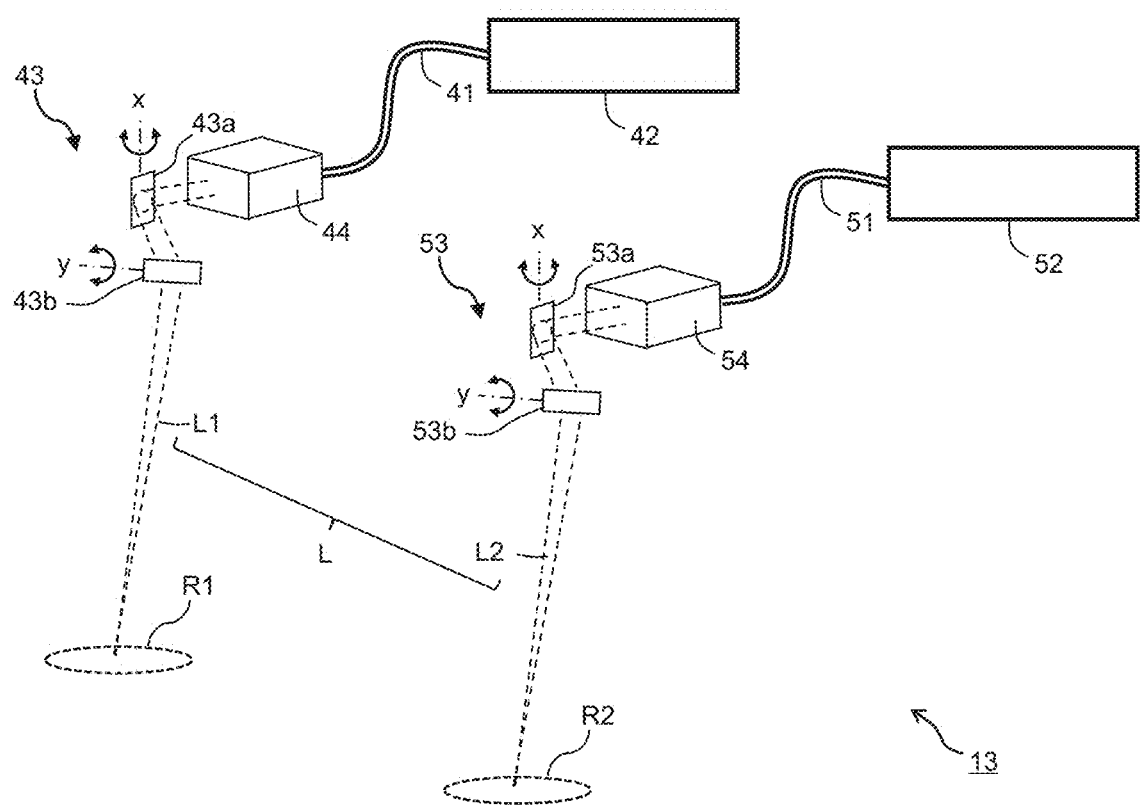
FIG. 3 is a schematic diagram showing the laser beam emitter 13 according to an embodiment of the present invention.
Figure 4:
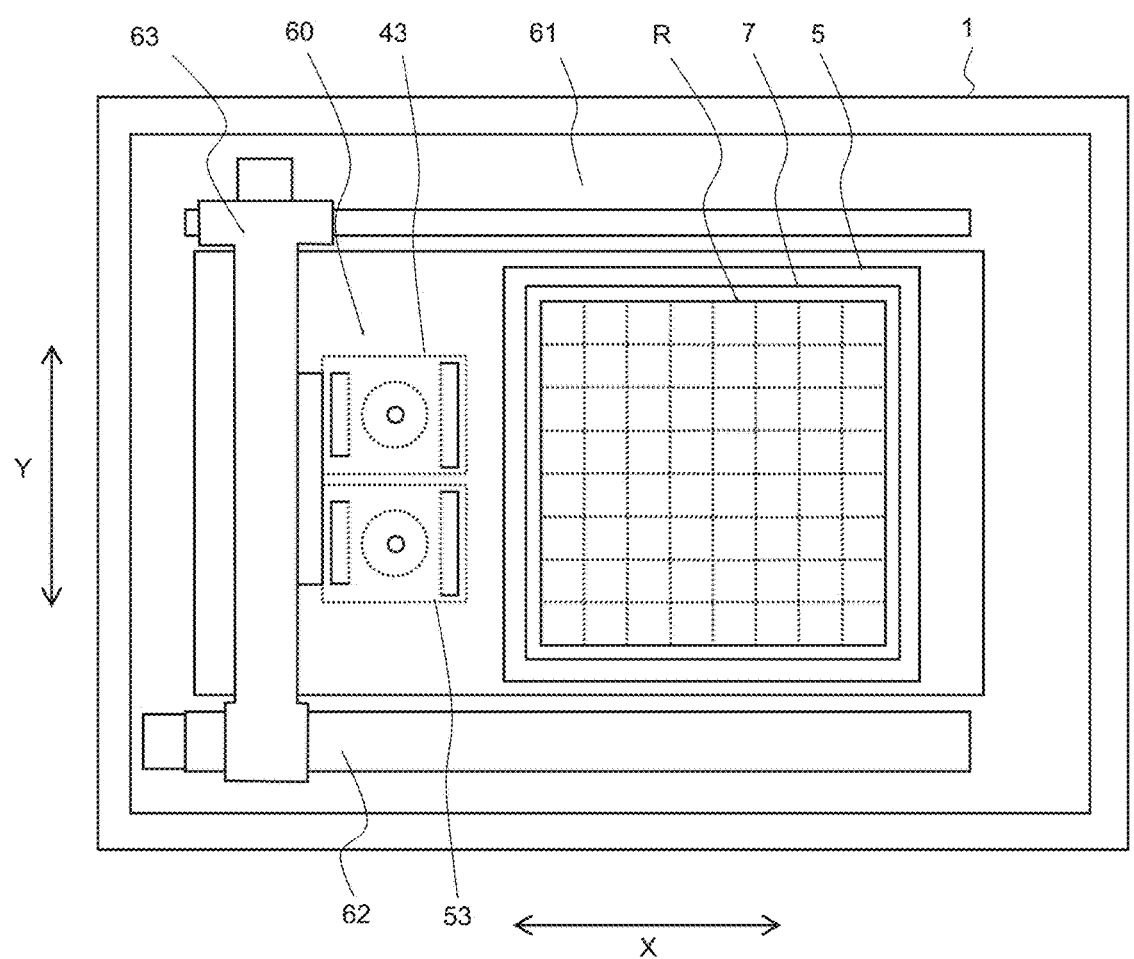
FIG. 4 is a schematic diagram showing the integration unit 60 and a peripheral portion thereof according to an embodiment of the present invention.
Figure 5:
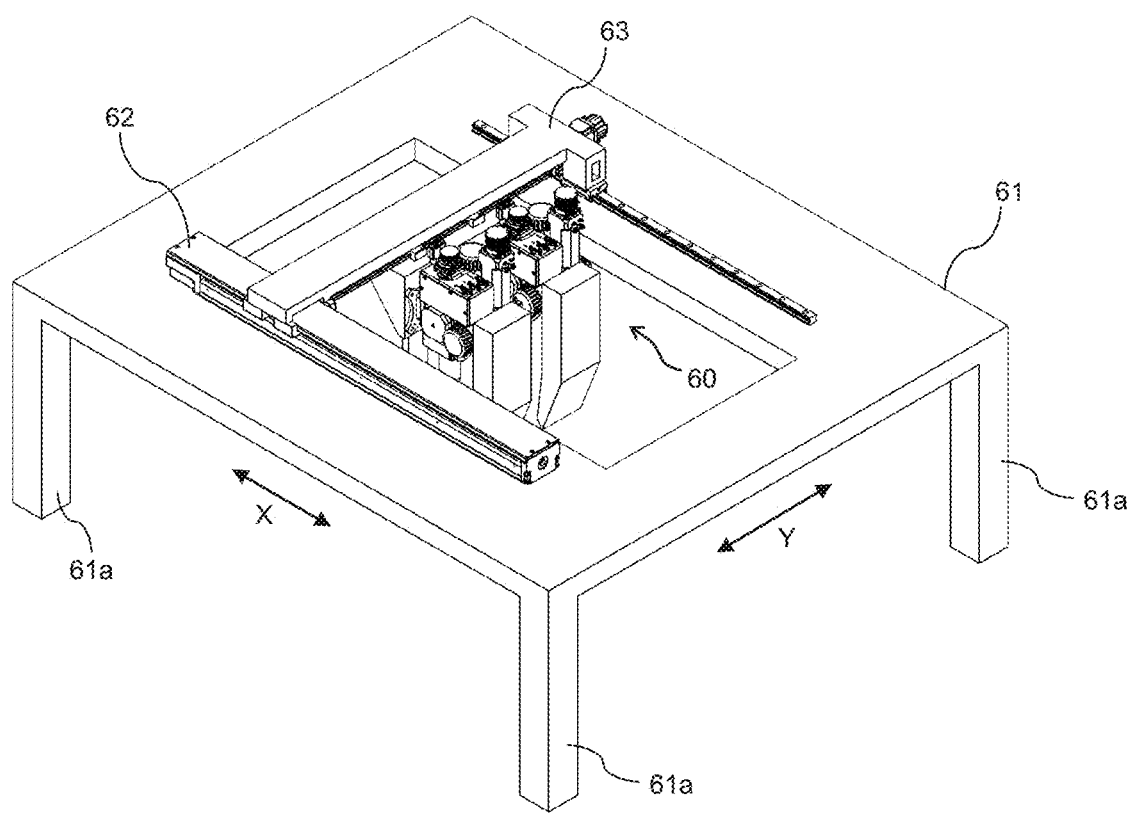
FIG. 5 is a perspective view showing the integration unit 60 and a peripheral portion thereof according to an embodiment of the present invention.
Figure 6:
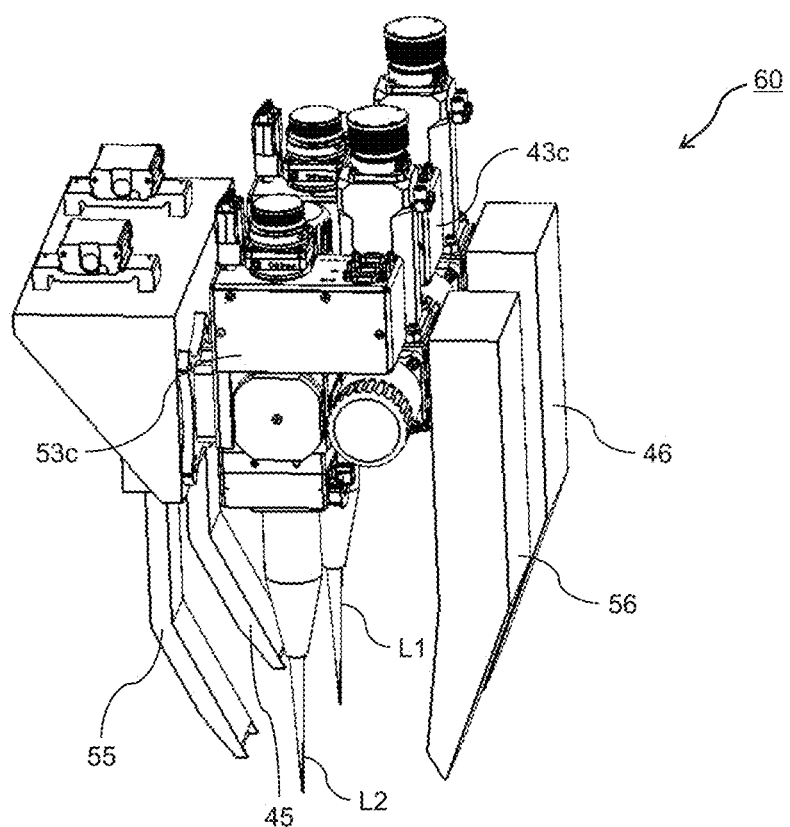
FIG. 6 is a perspective view of the integration unit 60 according to an embodiment of the present invention.
Figure 7:
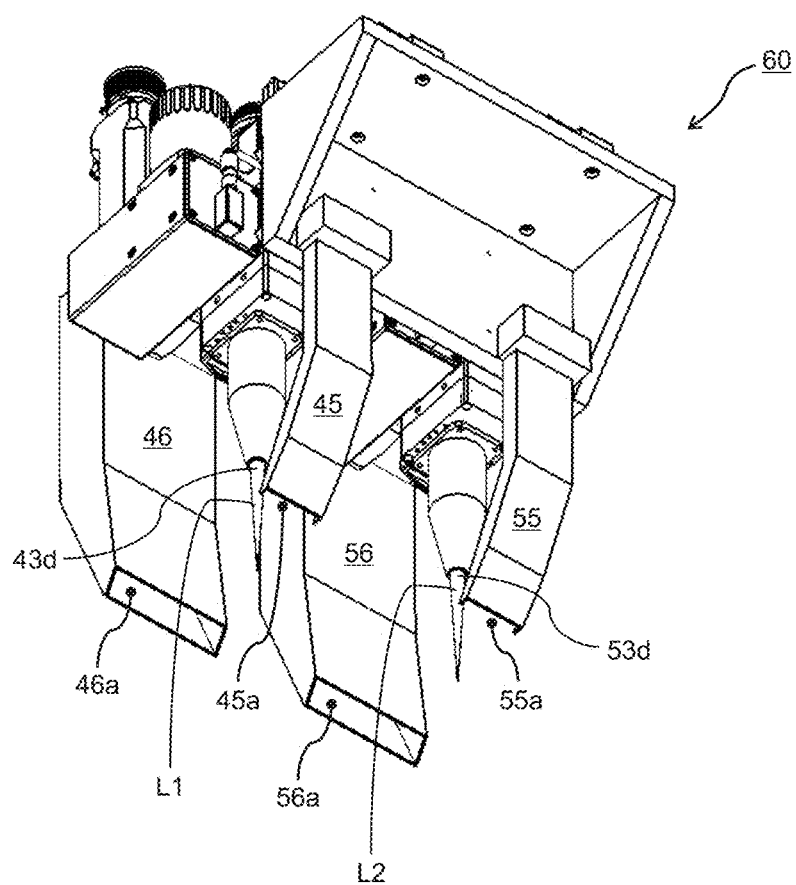
FIG. 7 is a perspective view of the integration unit 60 according to the embodiment of the present invention viewed from another angle.

Subsequently, the integration unit 60 according to the technical features of the present invention will be described. FIG. 3 is a schematic diagram showing a laser beam emitter 13 for scanning and emitting the laser beam L (L1 and L2) according to the embodiment of the present invention. FIG. 4 is a schematic diagram showing the integration unit 60 and the peripheral portion thereof according to the embodiment of the present invention. FIG. 5 to FIG. 7 are perspective views showing the integration unit 60 according to the embodiment of the present invention. The integration unit 60 is a unit in which the laser beam emitter 13, the inert gas supplying nozzles 45 and 55, and the fume suction ducts 46 and 56 are integrated. The laser beam emitter 13 includes first and second laser sources 42 and 52, first and second galvanometer mirror units 43 and 53, and first and second focus control units 44 and 54. The first and second laser beams L1 and L2 are emitted to predetermined portions of the material powder layer 8 formed on the molding region R to sinter the material powder at the irradiation position. In the present specification, "inert gas" is gas such as nitrogen gas, argon gas, or helium gas, which does not substantially react with the material powder.

The inert gas supplying nozzles 45 and 55 are disposed so as not to physically interfere with the laser beam L scanned by the galvanometer mirror units 43 and 53, and are configured so as to supply the inert gas from the inert gas supplying openings 45a and 55a. Specifically, the first inert gas supplying opening 45a of the first inert gas supplying nozzle 45 is connected to an inert gas supplying device 15 (described later). The clean inert gas flows toward the irradiation path (described later) of the first laser beam L1. The second inert gas supplying opening 55a of the second inert gas supplying nozzle 55 is connected to an inert gas supplying device 15. The clean inert gas flows toward the irradiation path (described later) of the second laser beam L2. The fume suction ducts 46, 56 have fume suction openings 46a, 56a from which fumes are discharged by suctioning inert gas containing fumes. Specifically, the first fume suction opening 46a of the first fume suction duct 46 and the second fume suction opening 56a of the second fume suction duct 56 are connected to the fume collector 19 (described later) via the fume suction duct box 21. Inert gas containing fumes is discharged to the outside of the chamber 1 by the above configuration.

The first laser source 42 irradiates the first laser beam L1 (one of the laser beam L). As described later, since the first laser source 42 is connected to the first focus control unit 44 via the optical fiber 41, the first laser source 42 may be incorporated in the integration unit 60, or may be disposed at the outside of the chamber 1. Here, the laser beam L is a laser capable of sintering the material powder, and is, for example, a CO2 laser, a fiber laser, a YAG laser, or the like.

The first focus control unit 44 is connected to the first laser source 42 via the optical fiber 41, and focuses the first laser beam L1 to adjust it to a desired spot diameter. The first galvanometer mirror unit 43 is composed of first galvanometer mirrors 43a and 43b with two axes, and controls two-dimensionally the first laser beam L1 outputted from the first laser source 42. Specifically, the first galvanometer mirror 43a scans the first laser beam L1 in the direction of the arrow X, and the first galvanometer mirror 43b scans the first laser beam L1 in the direction of the arrow Y. The first galvanometer mirror unit 43 is controlled in rotation angle according to the magnitude of the rotation angle control signal inputted from the control device (not shown). With the aid of such characteristics, the first laser beam L1 can be irradiated to a desired position, by changing the magnitude of the rotation angle control signal inputted into the each actuator of the first galvanometer mirror unit 43. The first laser beam L1 passed through the first galvanometer mirror unit 43 is irradiated onto the material powder layer 8 formed in the molding region R.

The second laser source 52 irradiates the second laser beam L2 (the other of the laser beam L). As described later, since the second laser source 52 is connected to the second focus control unit 54 via the optical fiber 51, the second laser source 52 may be incorporated in the integration unit 60, or may be disposed at the outside of the chamber 1.

The second focus control unit 54 is connected to the second laser source 52 via the optical fiber 51, and focuses the second laser beam L2 to adjust it to a desired spot diameter. The second galvanometer mirror unit 53 is composed of second galvanometer mirrors 53a and 53b with two axes, and controls two-dimensionally the second laser beam L2 outputted from the second laser source 52. Specifically, the second galvanometer mirror 53a scans the second laser beam L2 in the direction of the arrow X, and the second galvanometer mirror 53b scans the second laser beam L1 in the direction of the arrow Y. The second galvanometer mirror unit 53 is controlled in rotation angle according to the magnitude of the rotation angle control signal inputted from the control device (not shown). With the aid of such characteristics, the second laser beam L2 can be irradiated to a desired position by changing the magnitude of the rotation angle control signal inputted to each actuator of the second galvanometer mirror unit 53. The second laser beam L2 passed through the second galvanometer mirror unit 53 is irradiated onto the material powder layer 8 formed in the molding region R.

As shown in FIGS. 4 and 5, the stage table 61 is provided with the X direction stage 62 configured to be horizontally movable in the direction of the arrow X, and the Y direction stage 63 configured to be horizontally movable in the direction of the arrow Y. The integration unit 60 is provided on the Y direction stage 63. The X direction stage 62 and the Y direction stage 63 are an example of a moving device for moving the integration unit 60. With such configurations, the integration unit 60 can horizontally move in the arrow X direction and the arrow Y direction. Specifically, the integration unit 60 can be moved to the molding table 5, without changing the relative positional relationship between the first and second galvanometer mirror units 43 and 53, the first and second inert gas supplying nozzles 45 and 55, and the first and second fume suction ducts 46 and 56. Here, as shown in FIG. 5, the first and second galvanometer mirror units 43 and 53 are disposed in parallel in the arrow Y direction.

The stage table 61 is supported by, for example, four legs 61a on the base table 4. Stage base 61 has an opening formed for passing the integration unit 60. The X direction stage 62 has, across the opening, a main guide rail, a main guide block movably guided by the main guide rail, a sub guide rail, and a sub guide block movably guided by the sub guide rail. The main guide rail and the sub guide rail are in parallel with the arrow X direction, respectively. For example, the main guide rail includes a ball screw whose rotation axis is parallel with the arrow X direction, a ball screw nut screwed to the ball screw and restricted in rotation, and a motor for moving the ball screw nut, whose rotation is restricted by rotating the ball screw around its axis, forward and backward in the direction or the rotation axis. The main guide block is fixed to the ball screw nut and moved with it. The X direction stage 62 supports both ends of the Y direction stage 63 with the main guide block and the sub guide block, respectively. The X direction stage 62 moves the Y direction stage 63 in the direction of the arrow X by moving the main guide block. The Y direction stage 63 has a guide rail and a guide block which is guided by the guide rail. The guide rail is parallel to the arrow Y direction. For example, the guide rail includes a ball screw whose rotation axis is parallel to the direction of the arrow Y, a ball screw nut screwed to the ball screw and restricted in rotation, and a motor for moving the ball screw nut, whose rotation is restricted by rotating the ball screw around its axis, forward and backward in the direction of the rotation axis. The guide block is fixed to the ball screw nut and moves together. The Y direction stage 63 moves the integration unit 60 in the Y direction by attaching the integration unit 60 to the guide block and moving the guide block in the arrow Y direction.

In particular, as described also in the above-mentioned problem, normally, when the chamber 1 is enlarged, removal of fume cannot be completed in time so that a clean environment cannot be maintained to such an extent that molding in the chamber 1 is possible, which hinders molding. However, by adopting such an integration unit, it is possible to always realize a flow of inert gas between positions close to the irradiation position of the laser beam L. That is, it is advantageous that the enlargement of the chamber 1, which has been difficult in the prior art, can be realized. Preferably, the inert gas supplying openings 45a, 55a and the fume suction openings 46a, 56a are positioned to face each other. Here, as shown in FIG. 5 to FIG. 7, the first inert gas supplying opening 45a and the first fume suction opening 46a are provided along the arrow X direction to be opposed to each other so that an irradiation path of the laser beam L1 is placed therebetween. The second inert gas supplying opening 55a and the second fume suction opening 56a are provided along the arrow X direction to be opposed to each other so that an irradiation path of the laser beam L2 is placed therebetween. However, it should be noted that FIG. 1 and FIG. 9 to FIG. 23 are simplified schematic diagrams. In any case, such configurations can realize particularly efficient inert gas flow.

As shown in FIG. 4 to FIG. 6, the first and second galvanometer mirror units 43 and 53 are accommodated in the first and second housings 43c and 53c which are hermetically sealed, respectively. Tapered cylindrical first and second cover units through which the laser beams L (L1 and L2) is passed, are provided under the first and second housings 43c and 53c, respectively. The holes 43d, 53d through which the laser beams L (L1 and L2) is passed, are provided on the lower surface of the first and second cover units, respectively. And the windows (not shown) are provided on the upper surfaces of the first and second cover units (an example of a set of these is "galvanometer scanner" in the claims). Specifically, the first galvanometer mirror unit 43 is accommodated in the first housing 43c which is hermetically sealed. A tapered cylindrical first cover unit through which the laser beam L1 passes is provided under the first housing 43c. The hole 43d through which the first laser beam L1 passes is provided on the lower surface of the first cover unit, and the first window (not shown) is provided on the upper surface (An example of a set of these is the "the first galvanometer scanner" in the claims). The second galvanometer mirror unit 53 is accommodated in the second housing 53c which is hermetically sealed. A tapered cylindrical second cover unit through which the laser beam L2 passes is provided under the second housing 53c. The hole 53d through which the second laser beam L2 passes is provided on the lower surface of the second cover unit, and the second window (not shown) is provided on the upper surface (An example of a set of these is the "the second galvanometer scanner" in the claims). Here, the window is formed of a material that is capable of transmitting the laser beam L. For example, if the laser beam L (L1 and L2) is a fiber laser or a YAG laser, the window can be made of quartz glass.

The galvanometer mirror units 43, 53 have predetermined small irradiation region R1, R2. For example, when the integration unit is not moved, the first and second predetermined small irradiation regions R1 and R2 are maximum areas that the first and second galvanometer mirror units 43 and 53 can scan and irradiate the laser beams L1 and L2, or an area contained in the maximum area. In the lamination molding apparatus according to the present embodiment, these small irradiation regions R1 and R2 can be moved by moving the integration unit 60. Utilizing such features, for example, in order to mold a large molded object, the galvanometer mirror units 43 and 53 scan the laser beam L (L1 and L2) in the direction of the arrow X/Y, and irradiates the laser beam L to the material powder layer 8. After the irradiation of the laser beam L (L1 and L2) in the small irradiation regions R1 and R2, the small irradiation regions R1 and R2 are moved by moving the integration unit 60. Then the laser beam L (L1 and L2) may be irradiated within the newly determined small irradiation regions R1 and R2. By moving the integration unit 60, it is possible to scan and irradiate the laser beam L (L1 and L2) to the largest large irradiation regions S1 and S2 that the small irradiation region R1 and R2 can cover.

Figure 8:
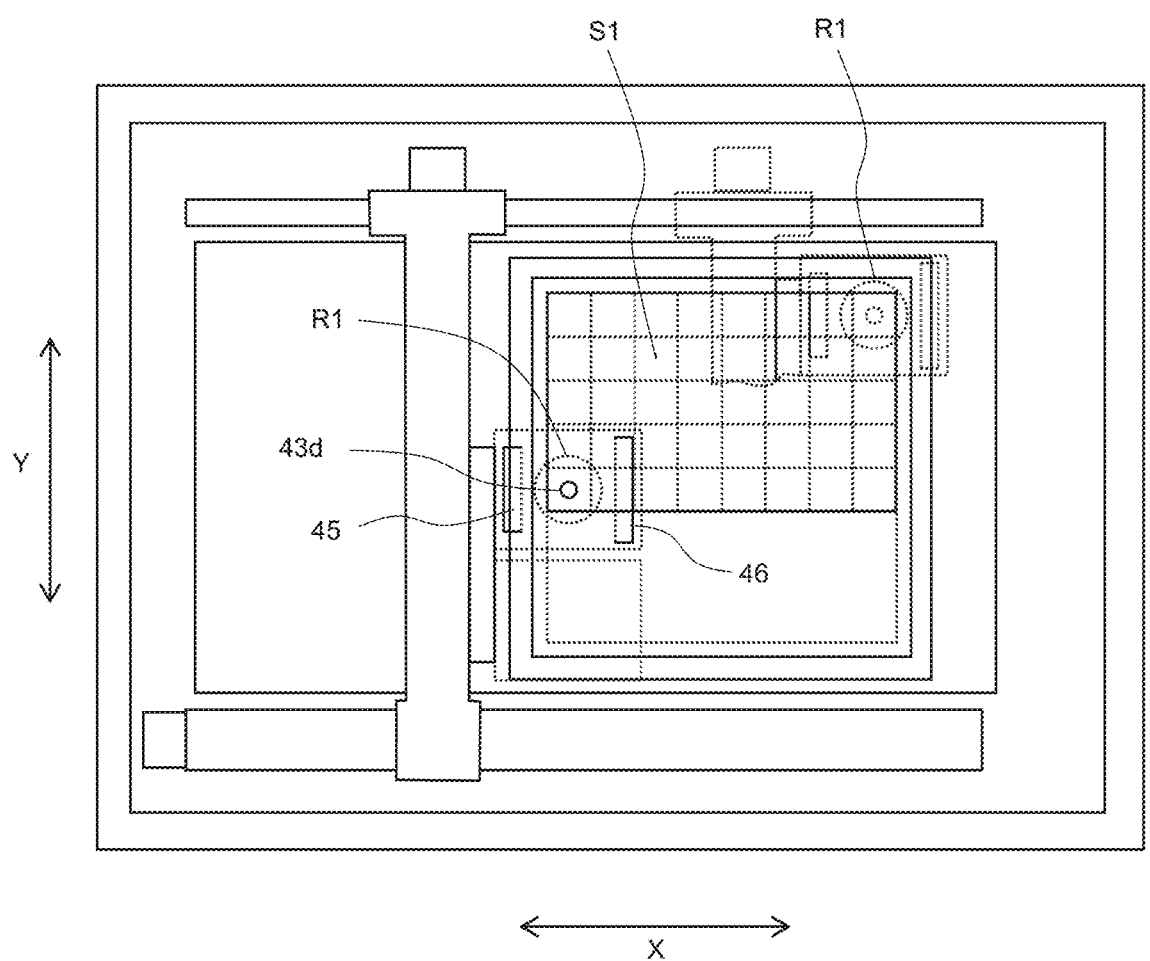
FIG. 8 is a schematic diagram showing the predetermined first small irradiation region R1 and the predetermined first large irradiation region S1.
Figure 9:
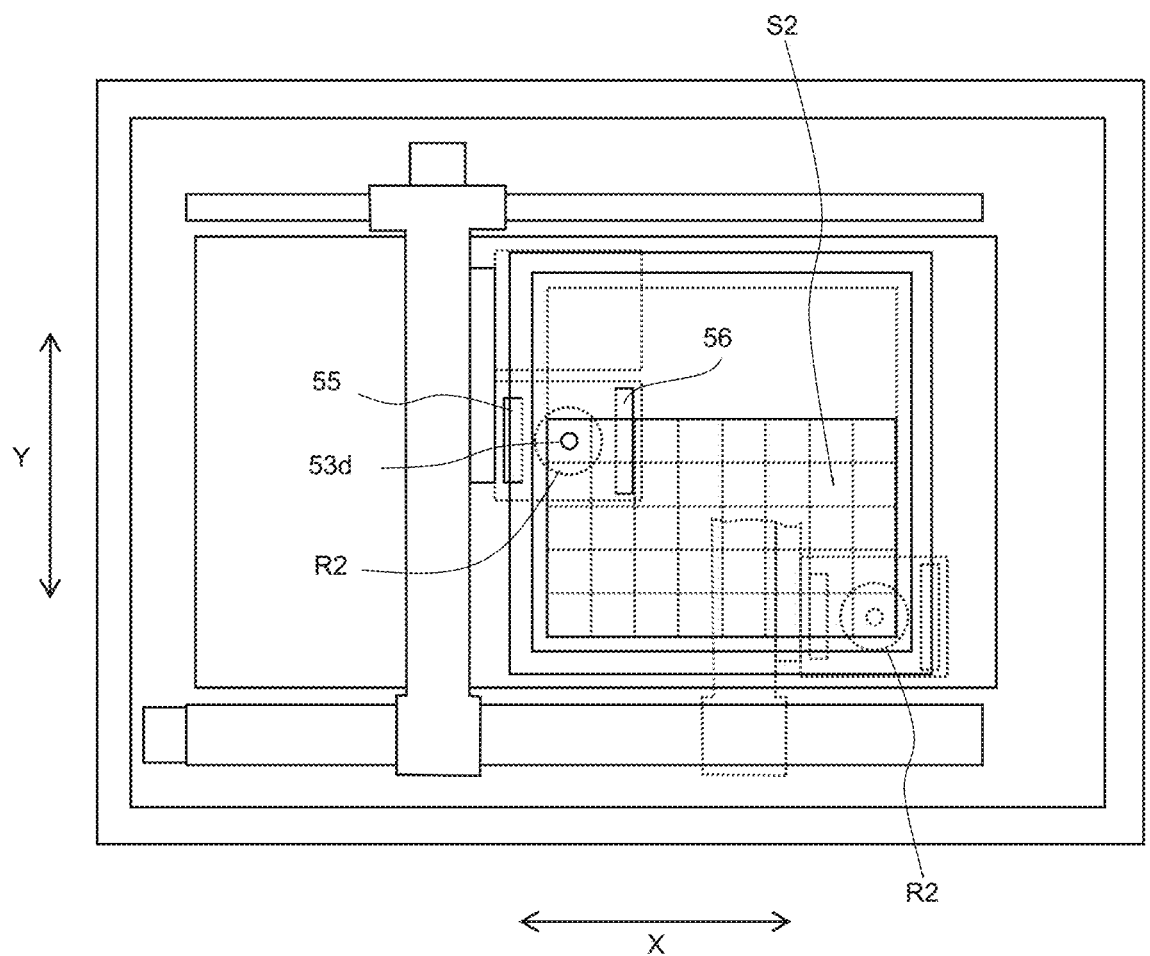
FIG. 9 is a schematic diagram showing the predetermined second small irradiation region R2 and the predetermined second large irradiation region S2.
Figure 10:
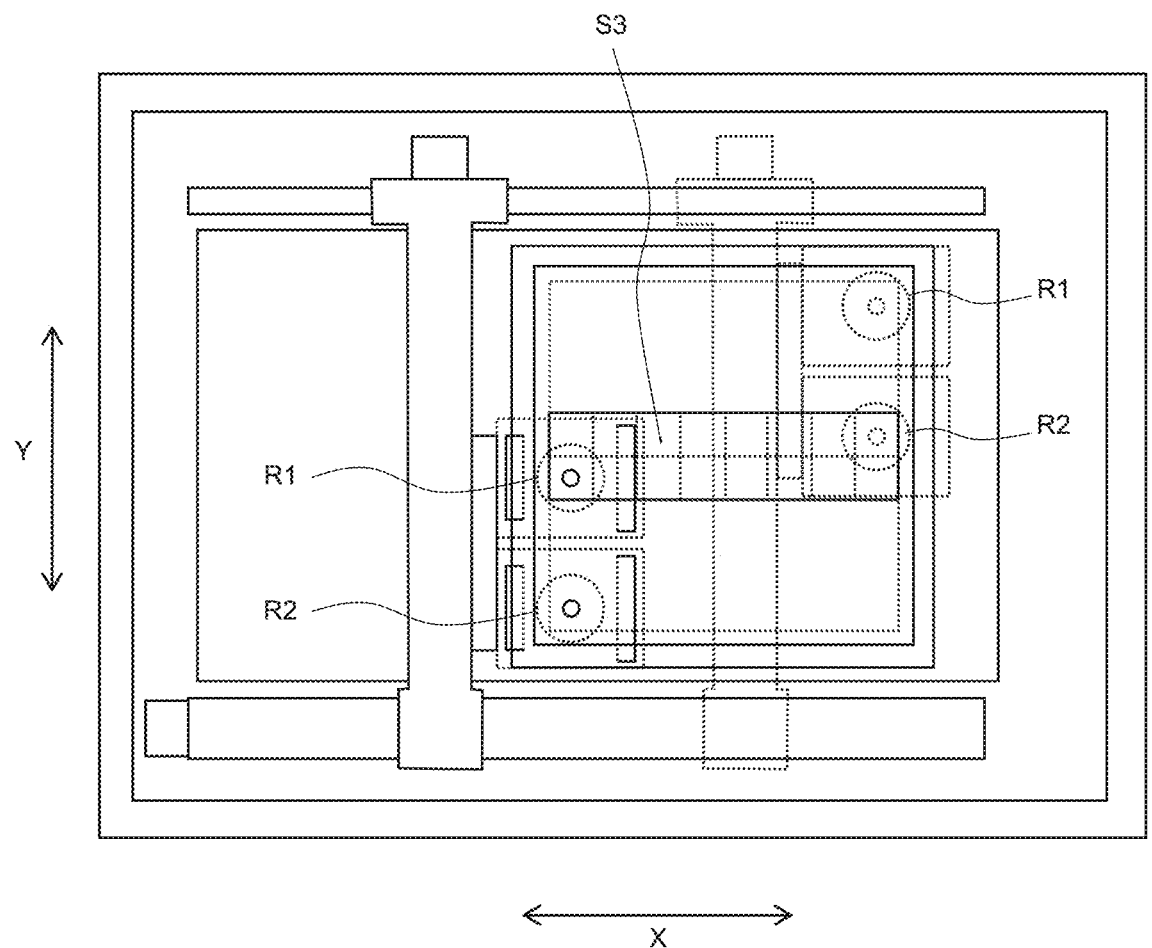
FIG. 10 shows the irradiation region S3, the predetermined first small irradiation region R1, and the predetermined second small irradiation region R2 showing a region where the predetermined first large irradiation region S1 and the predetermined second large irradiation region S2 overlap.

FIG. 8 to FIG. 10 are diagrams showing the relationships between the predetermined first small irradiation region R1, the predetermined second small irradiation region R2, the predetermined first large irradiation region S1, the predetermined second large irradiation region S2, and the overlapping predetermined irradiation region S3. As shown in FIG. 8 to FIG. 10, the first and second galvanometer mirror units 43 and 53 must be arranged so as to avoid physical interference, and at the same time, the first and second small irradiation regions R1 and R2 do not overlap each other. On the other hand, it should be noted that by moving the integration unit 60, the largest first large irradiation region S1 (see FIG. 8) that can be covered by the first small irradiation region R1, and the largest second large irradiation region S2 (see FIG. 9) that can be covered by the second small irradiation region R2, are partially overlapped like the irradiation region S3 (see FIG. 10). This is because there should be no area between the first and second large irradiation regions S1 and S2 that cannot irradiate the first and second laser beams L1 and L2. Here, the logical sum region of the first and second large irradiation regions S1 and S2 corresponds to the molding region R.

3. Inert Gas Supplying and Discharging System

Next, the inert gas supplying and discharging system will be described. The inert gas supplying and discharging system includes a plurality of inert gas supplying openings and discharging openings provided in the chamber 1, and includes pipes connecting the supplying openings and the discharging openings to the inert gas supplying device 15 and the fume collector 19. In the present embodiment, inert gas supplying and discharging system has supplying openings including the chamber supplying opening 1b, the sub supplying opening 1e, and inert gas supplying opening 45a and 55a, and discharging openings including the chamber discharging opening 1c and fume suction opening 46a and 56a.

The chamber discharging opening 1c is provided on the side plate of the chamber 1 at a predetermined distance from the predetermined irradiation region. Preferably, a suction device (not shown) may be provided so as to be connected to the chamber discharging opening 1c. The suction device helps to efficiently eliminate fumes from the irradiation path of the laser beam L. Further, a larger amount of fume can be discharged by the suction device at the chamber discharging opening 1c, and fumes are less likely to diffuse in the molding space 1d.

The chamber supplying opening 1b is provided on the end of the base table 4 so as to face the chamber discharging opening 1c being across a predetermined irradiation region. Since the chamber supplying opening 1b supplies the inert gas toward the chamber discharging opening 1c, the inert gas can always flow in the same direction and stable sintering can be performed.

Further, the inert gas supplying and discharging system of the present embodiment includes the sub supplying opening 1e, the inert gas supplying opening 45a, 55a, and the fume suction opening 46a, 56a. The sub supplying opening 1e is provided on the side plate of the chamber 1 facing the chamber discharging opening 1c, and supplies, to the molding space 1d, clean inert gas with fume removed in the fume collector 19. The inert gas supplying opening 45a, 55a supply an inert gas toward the irradiation path of the laser beam L. The fume suction opening 46a, 56a discharge inert gas containing a large amount of fume in the vicinity of the irradiation path of the laser beam L. Preferably, the inert gas supplying and discharging system is arranged such that the direction in which the inert gas supplied from the chamber supplying opening 1b or the sub supplying opening 1e flows to the chamber discharging opening 1c, and the direction in which the inert gas supplied from inert gas supplying opening 45a and 55a flows to the corresponding fume suction openings 46a and 56a is the same.

The inert gas supplying device 15 and the fume collector 19 are connected to the inert gas supplying system to the chamber 1. The inert gas supplying device 15 supplies inert gas and has, for example, a membrane type nitrogen separator for taking out nitrogen gas from ambient air. In the present embodiment, as shown in FIG. 1, the inert gas supplying device 15 is connected to the chamber supplying opening 1b and the inert gas supplying opening 45a, 55a.

The fume collector 19 has fume suction duct boxes 21, 23 on its upstream and downstream sides, respectively. The inert gas including fume discharged from the chamber 1 is sent to the fume collector 19 via the fume suction duct box 21. And clean inert gas from which fume has been removed in the fume collector 19 is sent via the fume suction duct box 23 to the sub supplying opening 1e of the chamber 1. With such configurations, inert gas can be reused.

As shown in FIG. 1, the chamber discharging opening 1c and the fume suction opening 46a, 56a are connected to the fume collector 19 via the fume suction duct box 21 as a fume discharging system. The clean inert gas after the fume has been removed in the fume collector 19 is returned to the chamber 1 for reuse.

In particular, by supplying the inert gas from the inert gas supplying opening 45a, 55a, it is possible to maintain the irradiation path of the laser beam L in a fume-free and clean state. As a result, the material powder layer 8 is irradiated with the laser beam L without interrupting by the fume.

Preferably, the inert gas supplied from the inert gas supplying openings 45a, 55a is set to a pressure slightly higher (for example, 5% or more higher) than the pressure of the inert gas supplied to the other supplying openings. As a result, a flow toward the molding space 1d is easily to be formed. To keep the flow cleaner, it is preferable to increase the flow velocity towards the fume suction openings 46a, 56a to such a degree that the material powder is not rolled up. Further, it is preferable that the inert gas is locally supplied to the irradiation position of the laser beam L.

Clean inert gas from which the fume has been removed in the fume collector 19 may be sent to the chamber supplying opening 1b and the inert gas supplying openings 45a, 55a via the fume suction duct box 23. Further, the inert gas supplying device 15 may be connected to the sub supplying opening 1e. However, in this embodiment, preferably, the inert gas from the fume collector 19 is sent to the sub supplying opening 1e, and the inert gas from the inert gas supplying device 15 is sent to the chamber supplying opening 1b and the inert gas supplying openings 45a and 55a. The fume that could not be removed may remain in the inert gas from the fume collector 19. In the present embodiment, however, the inert gas from the fume collector 19 is not discharged to the space in which especially high purity is required (the space around the path of the laser beam L and the vicinity of the molding region R), so that the influence of the residual fumes can be minimized. Further, by setting the supplying pressure of the inert gas from the inert gas supplying device 15 to be higher than the supplying pressure of the inert gas from the fume collector 19, the inert gas from the fume collector 19 is restrained to flow to the path of the laser beam L or to the space near the molding region R, and the influence of residual fume is more effectively suppressed.

4. Lamination Molding Method

FIG. 11 to FIG. 21 are diagrams for explaining an example of a lamination molding method using the lamination molding apparatus according to the embodiment of the present invention. In FIG. 11 to FIG. 21, in consideration of visibility, a part of the constituent elements shown in FIG. 1 is omitted.

Figure 11:
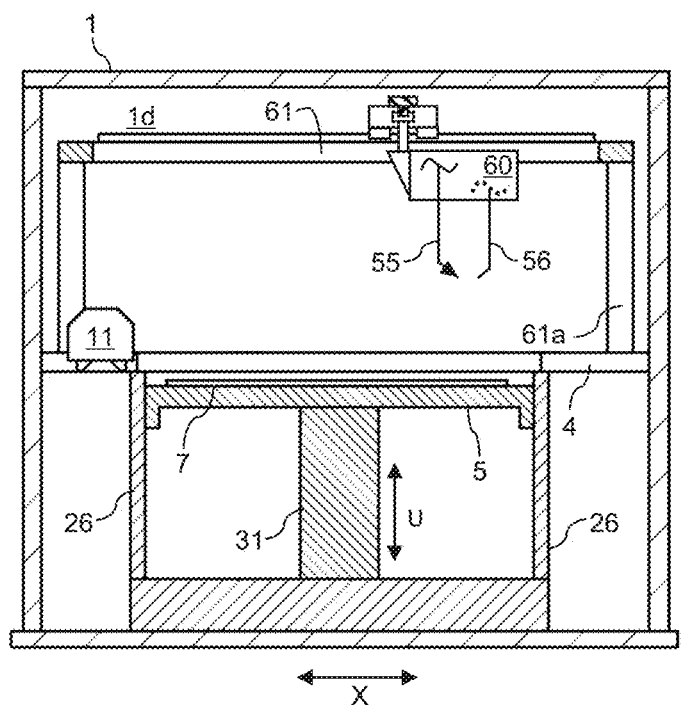
FIG. 11 is explanatory diagrams of a lamination molding method using a lamination molding apparatus according to an embodiment of the present invention.
Figure 12:
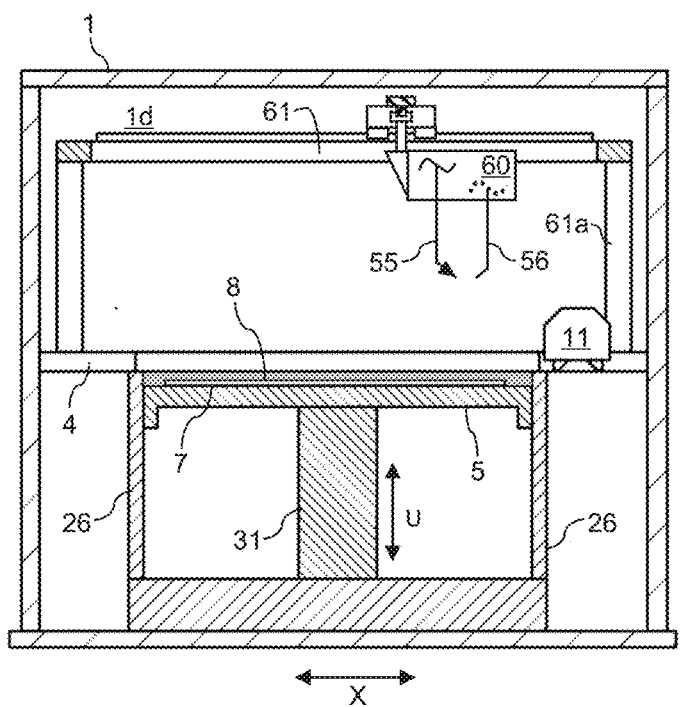
FIG. 12 is explanatory diagrams of a lamination molding method using a lamination molding apparatus according to an embodiment of the present invention.

First, the height of the molding table 5 is adjusted to an appropriate position while the molding plate 7 is placed on the molding table 5 (see FIG. 11). In this state, by moving the recoater head 11 filled with the material powder in the material holding section 11a from the left side to the right side of the molding region R in the direction of the arrow X in FIG. 1, the first layer of the material powder layer 8 (see FIG. 12).

Figure 13:
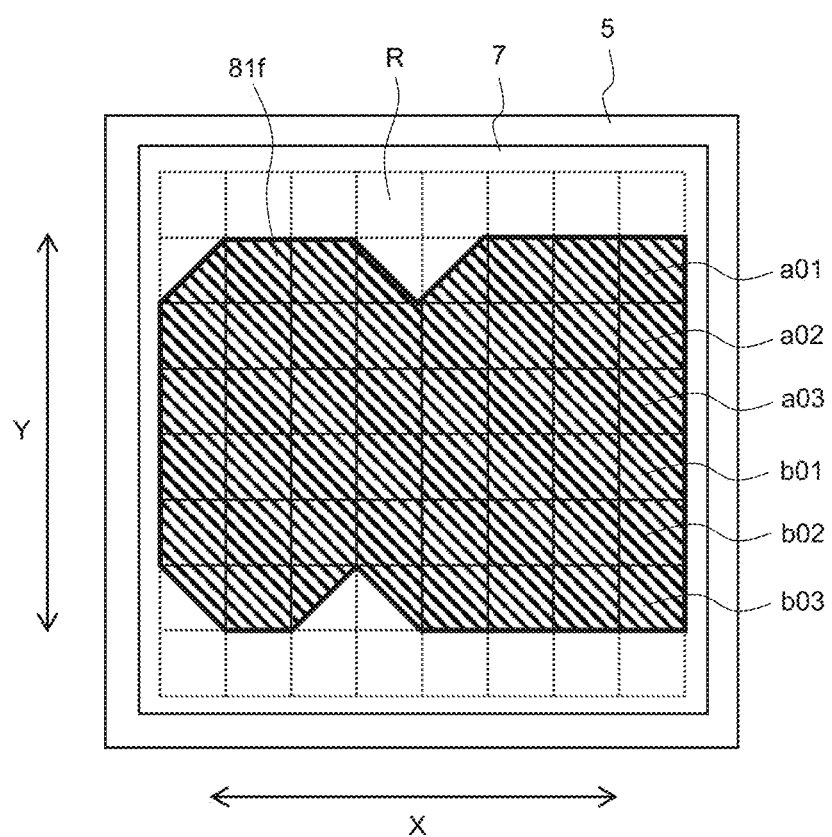
FIG. 13 is explanatory diagrams of a lamination molding method using a lamination molding apparatus according to an embodiment of the present invention.

Next, as shown in FIG. 13, a predetermined portion of the material powder layer 8 is irradiated with laser beam L (L1 and L2), and the irradiated portion of the material powder layer 8 is sintered to form the first sintered layer 81f.

First, the molding region R is divided into a plurality of cells separated in the directions of the arrows X and Y, respectively. As shown in FIG. 3 and FIG. 13, for example, the molding region R is divided into 8 parts in the direction of the arrow X and divided into 8 parts in the direction of the arrow Y. That is, the molding region R is divided into 64 small regions (hereinafter referred to as cells). Further, as shown in FIG. 8 to FIG. 10, for example, each cell is included in a predetermined large irradiation region S1 and S2, respectively. The cell can be accommodated in the first small irradiation region R1 irradiated with the first laser beam L1, and in the second small irradiation region R2 irradiated with the second laser beam L2. The distance between the first small irradiation region R1 and the second small irradiation region R2 is always maintained at a predetermined distance.

Figure 14:
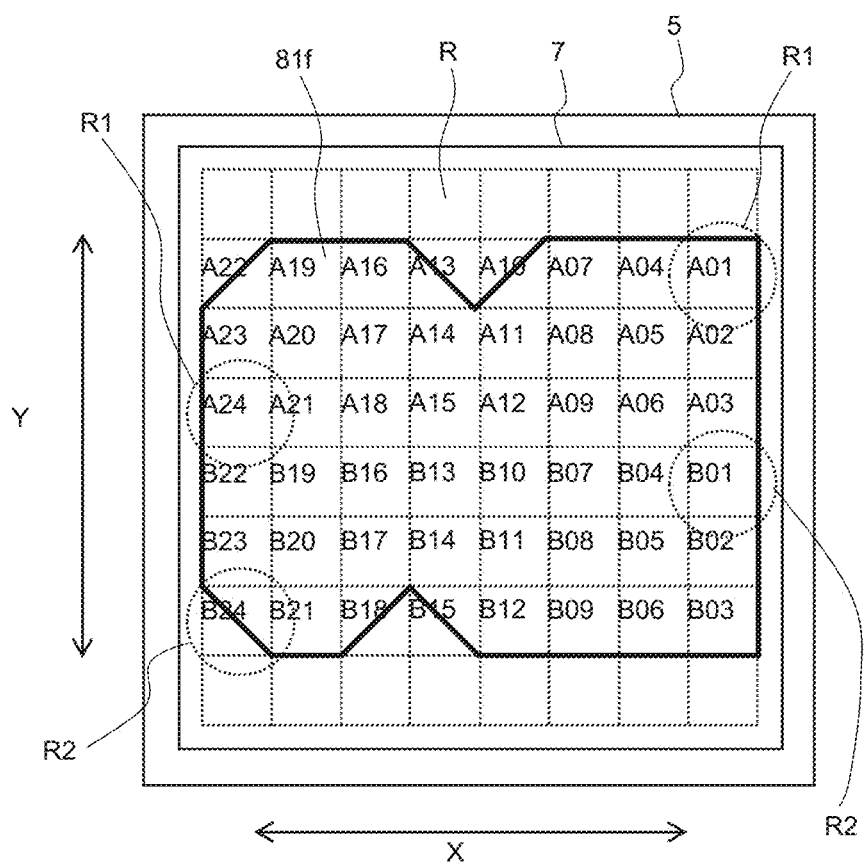
FIG. 14 is explanatory diagrams of a lamination molding method using a lamination molding apparatus according to an embodiment of the present invention.
Figure 15:
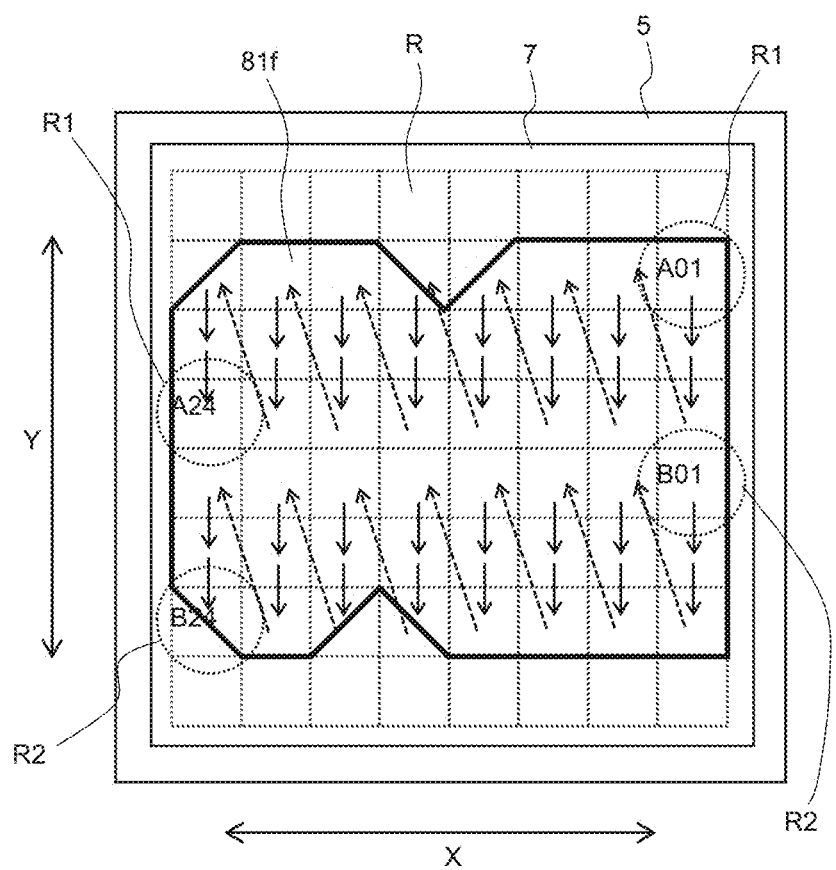
FIG. 15 is explanatory diagrams of a lamination molding method using a lamination molding apparatus according to an embodiment of the present invention.

As shown in FIG. 14, for example, two cells always exist between a pair of cells irradiated with the first and second laser beams L1 and L2, respectively. Further, the plurality of cells indicating the first sintered layer 81f are composed of 24 cells A01 to A24 in the first large irradiation region S1 to which the first laser beam L1 can be irradiated, and of 24 cells B01 to B24 in the second large irradiation region S2 to which the second laser beam L2 can be irradiated.

As shown in FIG. 14, a plurality of cells composing the first sintered layer 81f have a column arranged in the order of the cell A01, the cell A02, the cell A03, the cell B01, the cell B02, and the cell B03, a column arranged in the order of the cell A04, the cell A05, the cell A06, the cell B04, the cell B05, and the cell B06, a column arranged in the order of the cell A07, the cell A08, the cell A09, the cell B07, the cell B08, and the cell B09, a column arranged in the order of cell A10, cell A11, cell A12, cell B10, cell B11, and cell B12, a column arranged in the order of cells A13, cell A14, cell A15, cell B13, cell B14, and cell B15, a column arranged in the order of cell A16, cell A17, the cell A18, the cell B16, the cell B17, and the cell B18, a column arranged in the order of the cell A19, the cell A20, the cell A21, the cell B19, the cell B20, and the cell B21, and a column arranged in the order of the cell A22, the cell A23, cell A24, the cell B22, the cell B23, and the cell B24 from the back side toward the front side in the direction of the arrow Y, respectively. In the direction of the arrow X, from the right side to the left side, a column of the cell A01, a column of the cell A04, a column of the cell A07, a column of the cell A10, a column of the cell A13, a column of the cell A16, a column of the cell A19 are arranged in this order. The material powder layer 8 in the region indicated by the cell may be sintered all together, partially sintered, or not sintered. For example, the material powder layer 8 in the cell indicating the portion where no sintered layer is formed at all in the molding region is not sintered. However, even when the material powder layer 8 in one of the pair of cells is partially sintered and the material powder layer 8 in the other cell is not sintered at all, the first and second galvanometer mirror units 43 and 53 move respectively above the pair of cells.

Next, as shown in FIG. 13 to FIG. 19, a process of sintering the first sintered layer 81f will be described. First, the integration unit 60 moves, and the first and second galvanometer mirror units 43 and 53 simultaneously move. The first galvanometer mirror unit 43 moves above the cell A01. At the same time, the second galvanometer mirror unit 53 moves above the cell B01. The first laser beam L1 is irradiated to a predetermined portion of the material powder layer 8 in the cell A01 to obtain a partially sintered layer a01 constituting a part of the first sintered layer 81f. The second laser beam L2 is irradiated to a predetermined portion of the material powder layer 8 in the cell B02 to obtain a partial sintered layer b01 constituting a part of the first sintered layer 81f.

The first galvanometer mirror unit 43 may perform two-dimensional scanning all of the cells A01. At this time, by turning the output of the first laser source 42 on and off at a predetermined timing, the first laser beam L1 is irradiated to a predetermined portion of the material powder layer 8 to obtain a partially sintered layer a01 having a desired shape. The first galvanometer mirror unit 43 may perform two-dimensional scanning so as to irradiate the necessary portion of the cell A01 with the first laser beam L1. Similarly, the second galvanometer mirror unit 53 may perform two-dimensional scanning entirety of the cell B01. At this time, by turning the output of the second laser source 52 on and off at a predetermined timing, the second laser beam L2 is irradiated to a predetermined portion of the material powder layer 8 to obtain a partially sintered layer b01 having a desired shape. Further, the second galvanometer mirror unit 53 may perform two-dimensional scanning so as to irradiate the necessary portion in the cell B01 with the second laser beam L2.

Figure 16:
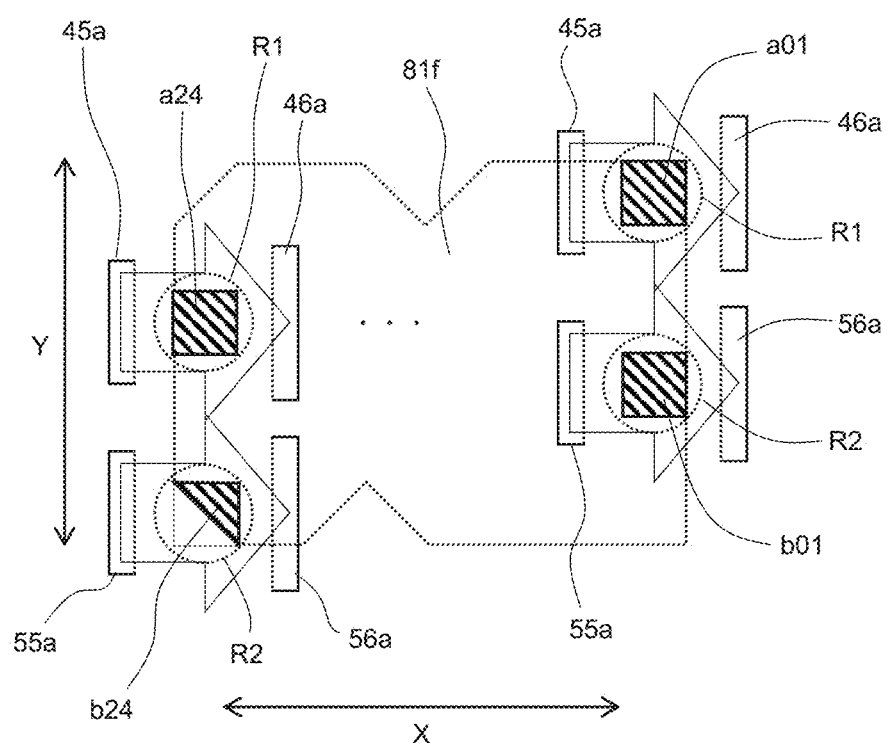
FIG. 16 is explanatory diagrams of a lamination molding method using a lamination molding apparatus according to an embodiment of the present invention.
Figure 17:
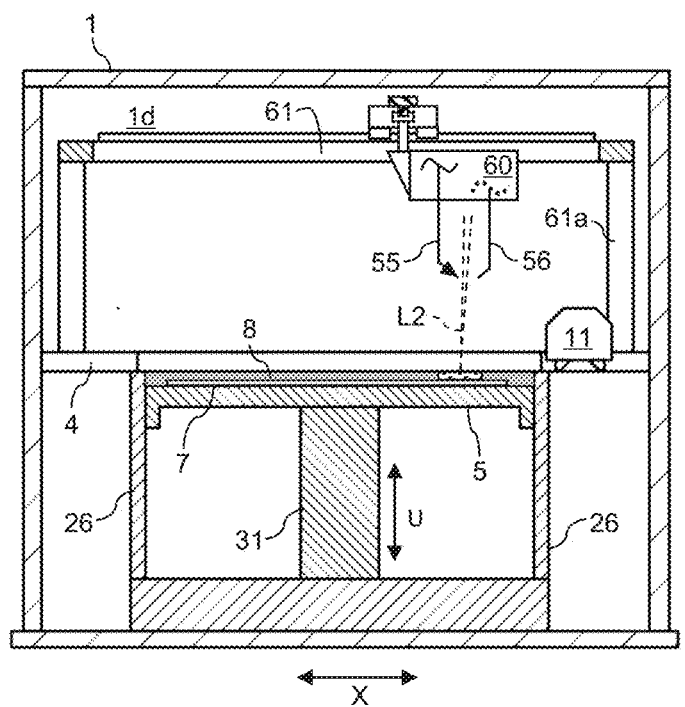
FIG. 17 is explanatory diagrams of a lamination molding method using a lamination molding apparatus according to an embodiment of the present invention.
Figure 18:
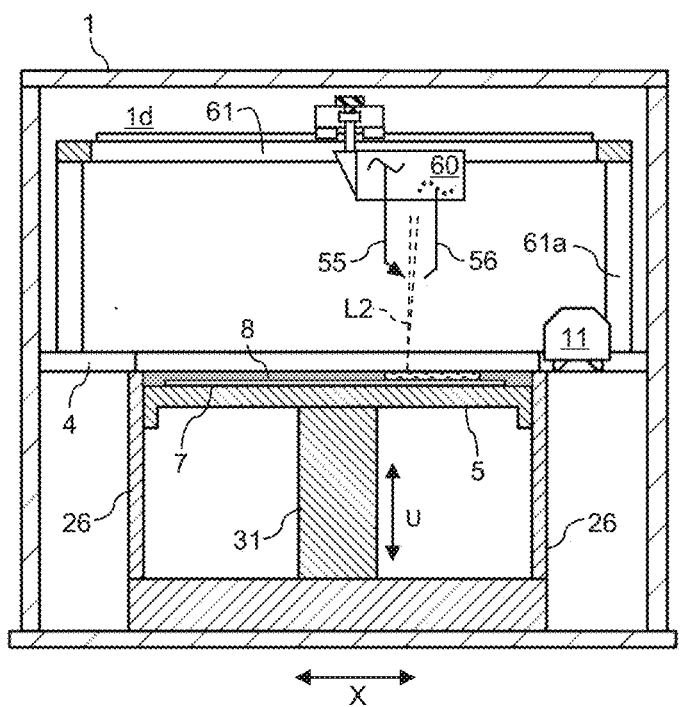
FIG. 18 is explanatory diagrams of a lamination molding method using a lamination molding apparatus according to an embodiment of the present invention.

For example, the first and second galvanometer mirror units 43, 53 perform two-dimensional scanning in the respective cells A 01, B01 via the same scanning path, by turning on and off the output of each of the first and second laser sources 42, 52 at different timings, partial sintered layers having different shapes can be formed in the partial sintered layer a01 and the partial sintered layer b01 (for example, the partial sintered layer a24 and the partial sintered layer b24 in FIG. 16). Here, the two-dimensional scanning by the first and second galvanometer mirror units 43 and 53 may be performed in a direction parallel to the arrow X direction (FIG. 18), in a direction parallel to the arrow Y direction (FIG. 17), in a direction inclined at a predetermined angle in both the arrow X direction and the arrow Y direction and parallel to the XY plane (FIG. 13 and FIG. 16). Or another various method can be applied without being limited.

The fumes generated during the sintering of the partially sintered layer a01 and the partially sintered layer b01 are mainly suctioned from the fume suction openings 46a, 56a in the fume suction ducts 46, 56 of the integration unit 60. Since the fume suction openings 46a and 56a are always arranged in the vicinity of the small irradiation regions R1 and R2 and the cells A01 and B01 are arranged in the small irradiation regions R1 and R2, it is possible to reliably remove the fumes. Furthermore, the inert gas supplying openings 45a, 55a of the inert gas supplying nozzles 45, 55 are disposed in positions near the small irradiation regions R1, R2 and opposite the fume suction openings 46a, 56a across the small irradiation regions R1, R2. An inert gas flow is generated from the inert gas supplying openings 45a and 55a passing over the small irradiation regions R1 and R2 to the fume suction openings 46a and 56a, and it is possible to reliably exclude the fume from the irradiation path of the laser beam L (L1 and L2).

Next, after forming the partial sintered layer a01 and the partial sintered layer b01, the integration unit 60 moves a distance corresponding to one cell from the back side to the front side in the arrow Y direction. The first and the second galvanometer mirror units 43 and 53 simultaneously move. The first galvanometer mirror unit 43 moves above the cell A02. At the same time, the second galvanometer mirror unit 53 moves above the cell B02. The first laser beam L1 is irradiated to a predetermined portion of the material powder layer 8 in the cell A02 so that the partial sintered layer a02 is obtained. The partial sintered layer a02 constitutes a part of the first sintered layer 81f and combines with another adjacent partial sintered layer. The second beam L2 is irradiated to a predetermined portion of the material powder layer in the cell B02 so that the partial sintered layer b02 is obtained. The partial sintered layer b02 constitutes a part of the first sintered layer 81f and combines with another adjacent partial sintered layer.

Next, after forming the partial sintered layer a02 and the partial sintered layer b02, the integration unit 60 moves a distance corresponding to one cell from the back side to the front side in the arrow Y direction. The first and the second galvanometer mirror units 43 and 53 simultaneously move. The first galvanometer mirror unit 43 moves above the cell A03. At the same time, the second galvanometer mirror unit 53 moves above the cell B03. The first laser beam L1 is irradiated to a predetermined portion of the material powder layer 8 in the cell A03 so that the partial sintered layer a03 is obtained. The partial sintered layer a03 constitutes a part of the first sintered layer 81*f* and combines with another adjacent partial sintered layer. The second beam L2 is irradiated to a predetermined portion of the material powder layer in the cell B03 so that the partial sintered layer b03 is obtained. The partial sintered layer b03 constitutes a part of the first sintered layer 81*f* and combines with another adjacent partial sintered layer. In this way, one partial sintered layer in which the six partial sintered layers a01, a02, a03, b01, b02, and b03 are combined, is obtained.

Next, after forming the partial sintered layer a03 and the partial sintered layer b03, the integration unit 60 moves a distance corresponding to two cells from the front side to the back side in the arrow Y direction. And the integration unit 60 moves a distance corresponding to one cell from the right side to the left side in the arrow X direction. The first and the second galvanometer mirror units 43 and 53 simultaneously move. The first galvanometer mirror unit 43 moves to a position above the cell A04. At the same time, the second galvanometer mirror unit 53 moves to a position above the cell B04. The first laser beam L1 is irradiated to a predetermined portion of the material powder layer 8 in the cell A04 so that the partial sintered layer a04 is obtained. The partial sintered layer a04 constitutes a part of the first sintered layer 81*f* and combines with another adjacent partial sintered layer. The second beam L2 is irradiated to a predetermined portion of the material powder layer 8 in the cell B04 so that the partial sintered layer b04 is obtained. The partial sintered layer b04 constitutes a part of the first sintered layer 81*f* and combines with another adjacent partial sintered layer.

Figure 19:
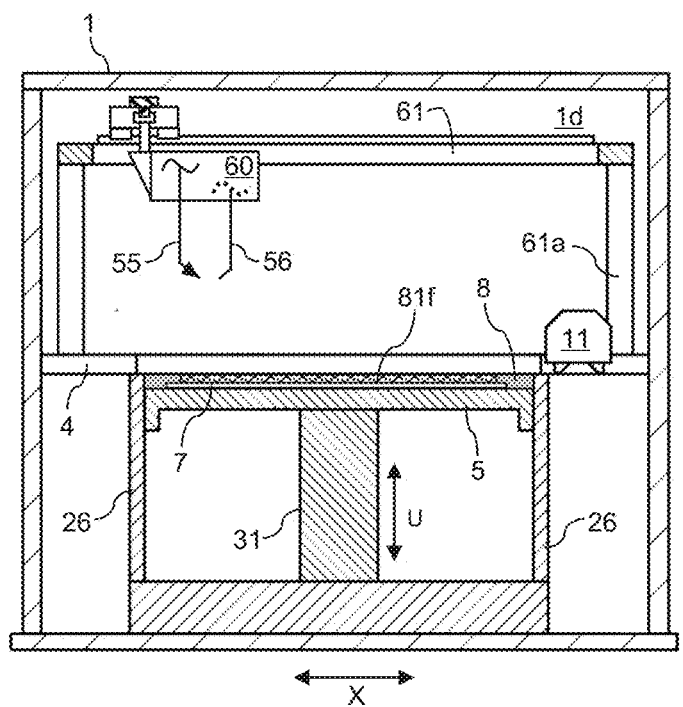
FIG. 19 is explanatory diagrams of a lamination molding method using a lamination molding apparatus according to an embodiment of the present invention.

By repeating these steps until partial sintered layers a24 and b24 are formed, partial sintered layers from a01 to a24 and partial sintered layers from b01 to b24 are combined with each other to obtain the first sintered layer 81*f* (FIG. 13 and FIG. 19).

Figure 20:
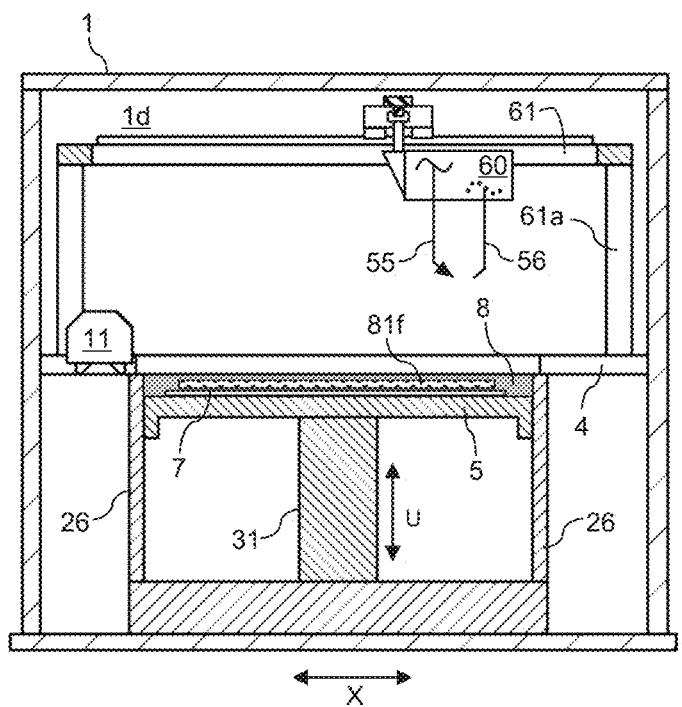
FIG. 20 is explanatory diagrams of a lamination molding method using a lamination molding apparatus according to an embodiment of the present invention.
Figure 21:
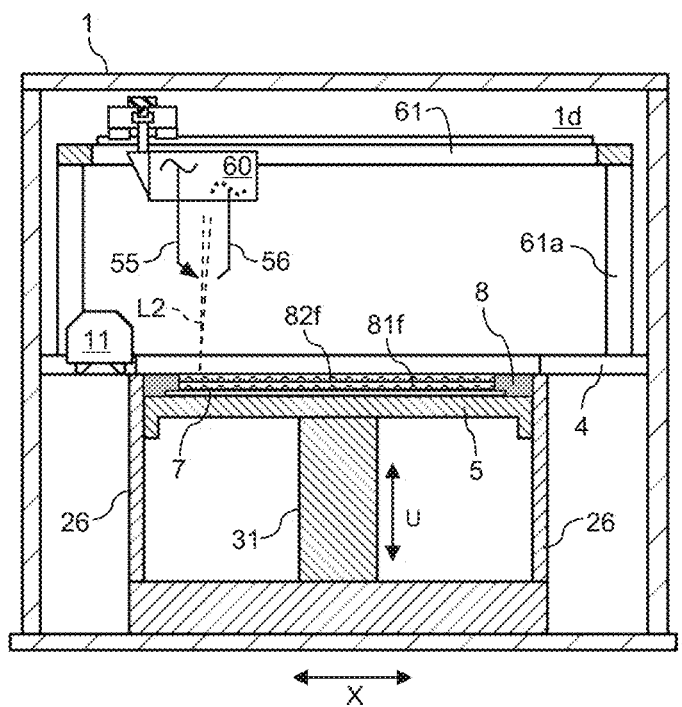
FIG. 21 is explanatory diagrams of a lamination molding method using a lamination molding apparatus according to an embodiment of the present invention.

Next, as shown in FIG. 20, by lowering the height of the molding table 5 by one layer of the material powder layer 8, and by moving the recoater head 11 from the right side to the left side of the molding region R, the second layer of material powder layer 8 is formed on the first sintered layer 81*f*.

Similarly, the first and second laser beams L1, L2 are irradiated to predetermined portions of the material powder layer 8 for each pair of cells showing the sintered layer 82*f* of the second layer, so as to obtain a plurality of partial sintered layers. As a result, the second sintered layer 82*f* combined with a plurality of partial sintered layers is obtained (See FIG. 21).

By repeating these steps, the third sintered layer and subsequent layers is formed. Here, adjacent partial sintered layers and sintered layers are strongly fixed to each other.

After the necessary number of sintered layers are formed, the sintered body can be obtained by removing the unsintered material powder. This sintered body can be used as a mold for resin molding, for example.

5. Modified Example

The lamination molding apparatus according to the present invention can also be implemented, for example, by the following mode.

Figure 22:
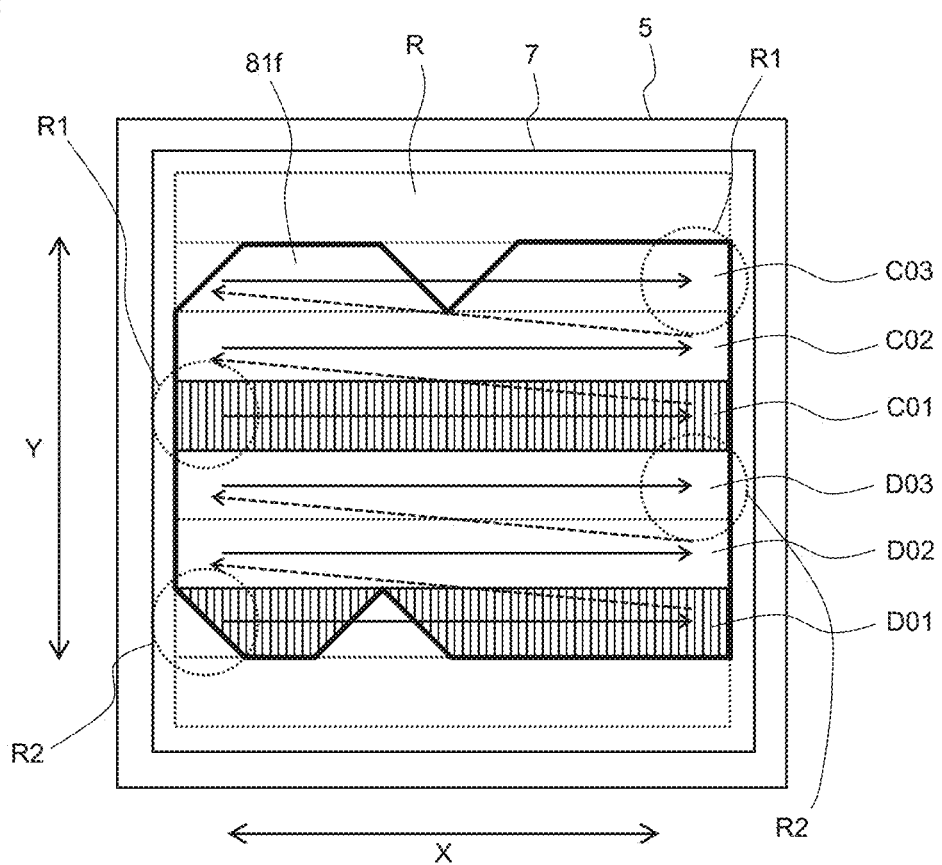
FIG. 22 is an explanatory diagram of a lamination molding method using a lamination molding apparatus according to a modified example of the embodiment of the present invention.
Figure 23:
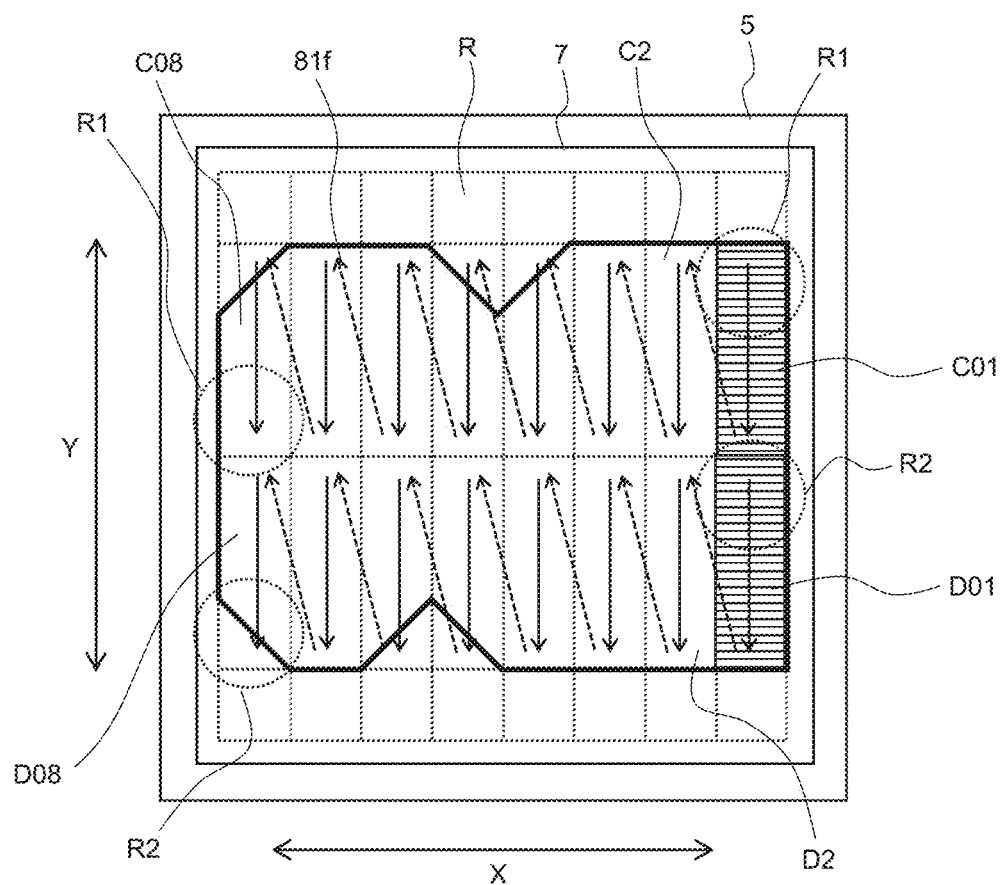
FIG. 23 is an explanatory diagram of a lamination molding method using a lamination molding apparatus according to a modified example of the embodiment of the present invention.

First, in the embodiment described above, the integration unit 60 moves to a position above a predetermined pair of cells, stops temporarily, irradiates the first and the second laser beams L1 and L2 to the material powder layer 8 in the pair of cells, obtains a partially sintered layer, and then repeats again moving to a position above the other pair of cells. However, the present invention is not limited to the above embodiment. As shown in FIG. 22 and FIG. 23, it is also possible to obtain the partially sintered layer by irradiating the material powder layer 8 with the first and second laser beams L1 and L2 while the integration unit 60 is moving in a predetermined direction. The different point from the above embodiment will be described below.

For example, as shown in FIG. 22, in the case that the first and second galvanometer mirror units 43 and 53 included in the integration unit 60 are arranged in the arrow Y direction, the molding region R may be divided into a plurality of cells which are arranged in the arrow X direction. The length of each cell is longer than the length of the first and second small irradiation regions R1 and R2 in the arrow X direction. The length of each cell is equal to or less than the length of the first and second small irradiation regions R1 and R2 in the arrow Y direction. For example, a plurality of cells showing the first sintered layer 81*f* are indicated by cells D01, D02, D03, C01, C02, and C03 which are arranged in order from the front side to the back side in the arrow Y direction. The cells C01 to C 03 and the cell D03 are included in the first large irradiation region S1. The cells D01 to D03 and the cell C01 are included in the second large irradiation region S2. The cells C01 and D03 are included in a predetermined irradiation region S3 in which the first large irradiation region S1 overlaps with the second large irradiation region S2. The first and second galvanometer mirror units 43 and 53 perform one-dimensional scanning reciprocating in the arrow Y direction. The first and second laser beams L1 and L2 are irradiated when being scanned from either one of the front side or the back side in the arrow Y direction to the other, and are not irradiated when scanning is performed from the other side to the one side.

In the integration unit 60, the first galvanometer mirror unit 43 is disposed above the left side of the cell C01 and the second galvanometer mirror unit 53 is disposed above the left side of the cell D01. The integration unit 60 moves from the left side to the right side in the arrow X direction. While the first and second galvanometer mirror units 43 and 53 reciprocate one-dimensional scanning once in the arrow Y direction, the integration unit 60 moves by a distance equal to or smaller than the spot diameter (diameter) of the first and second laser beam L1 and L2. After the partial sintered layer is obtained by sintering a predetermined portion of the material powder layer 8 in the cell C01 and the cell D01, the integration unit 60 stops the irradiation of the first and second laser beams L1 and L2, and moves the first galvanometer mirror unit 43 above the left side of the cell C02 and the second galvanometer mirror unit 53 above the left side of the cell D02. By repeating these steps, the first sintered layer 81*f* is obtained.

Further, for example, as shown in FIG. 23, in the case that the first and second galvanometer mirror units 43 and 53 included in the integration unit 60 are arranged in the arrow Y direction, the molding region R may be divided into a plurality of cells such as two in the arrow X direction and a plurality of parts in the Y direction. The length of each cell is equal to or less than the length of the first and second small irradiation regions R1 and R2 in the arrow X direction. The length of each cell is larger than the length of the first and second small irradiation regions R1 and R2 in the arrow Y direction. For example, a plurality of cells indicating the first sintered layer 81*f* are arranged from the back side to the front side in the arrow Y direction, the cell C01 and the cell D01, the cell C02 and the cell D02, ... , the cell C08 and the cell D08, and arranged from the right side to the left side in the arrow X direction, the cell C01 to the cell C08, and the cell D01 to the cell D08 in this order. The cells C 01 to the cell C08 are included in the first large irradiation region S1. The cells D01 to the cell D08 are included in the second large irradiation region S2. A part of the cells C01 to the cell C08 and a part of the cells D01 to the cell D08 are included in the irradiation region S3 in which the first large irradiation region S1 overlapped with the second large irradiation region S2. The first and second galvanometer mirror units 43 and 53 perform one-dimensional scanning reciprocating in the arrow X direction. The first and second laser beams L1 and L2 are irradiated when being scanned from either one of the left side or the right side in the arrow X direction to the other, and are not irradiated when scanning is performed from the other side to the one side.

In the integration unit 60, the first galvanometer mirror unit 43 is disposed above the back side of the cell C01 and the second galvanometer mirror unit 53 is disposed above the back side of the cell D01. The integration unit 60 moves from the back side to the front side in the arrow Y direction. While the first and second galvanometer mirror units 43 and 53 reciprocate one-dimensional scanning once in the arrow X direction, the integration unit 60 moves by a distance equal to or smaller than the spot diameter (diameter) of the first and second laser beam L1 and L2. After the partial sintered layer is obtained by sintering a predetermined portion of the material powder layer 8 in the cell C01 and the cell D01, the integration unit 60 stops the irradiation of the first and second laser beams L1 and L2, and moves the first galvanometer mirror unit 43 above the back side of the cell C02 and the second galvanometer mirror unit 53 above the back side of the cell D02. By repeating these steps, the first sintered layer 81f is obtained.

Note that sintered marks sintered by the first and second laser beams L1 and L2 that are one-dimensionally scanned while the integration unit 60 is moving, slightly incline in the moving direction of the integration unit 60. The slight inclination of the sintered marks is suppressed by lowering the speed of movement of the integration unit 60 or by increasing the scanning speed for irradiation of the first and second laser beams L1 and L2. In the case of increasing the scanning speed for irradiation of the first and second laser beams L1 and L2, it is preferable to decrease the speed of the backward scanning in which irradiation with the first and second laser beams L1 and L2 is not performed, to set standby time before the start of backward scanning in which irradiation with the first and second laser beams L1 and L2 is not performed, or to set standby time before the start of forward scanning in which irradiation with the first and second laser beams L1 and L2 is performed. The one-dimensional scanning may be performed in a direction inclined in both the arrow X direction and the arrow Y direction and in a direction parallel to the XY plane. The first and second laser beams L1 and L2 are scanned in parallel with the X direction or the Y direction, for example, during the movement of the integration unit 60 by the first and second laser beams L1 and L2 that are two-dimensionally scanned. Further, the first and second laser beams L1 and L2 may be two-dimensionally scanned while moving the integration unit 60 to obtain a desired sintered layer.

Second, although the first galvanometer mirror unit 43 having a pair of the first galvanometer mirror 43a, 43b and the second galvanometer mirror unit 53 having a pair of the second galvanometer mirrors 53a, 53b are adopted in the above embodiment, it is not limited thereto. For example, galvanometer mirror unit may be disposed one or three or more. Here, it is advantageous to have two or more galvanometer mirror units to shorten the process time.

Figure 24:
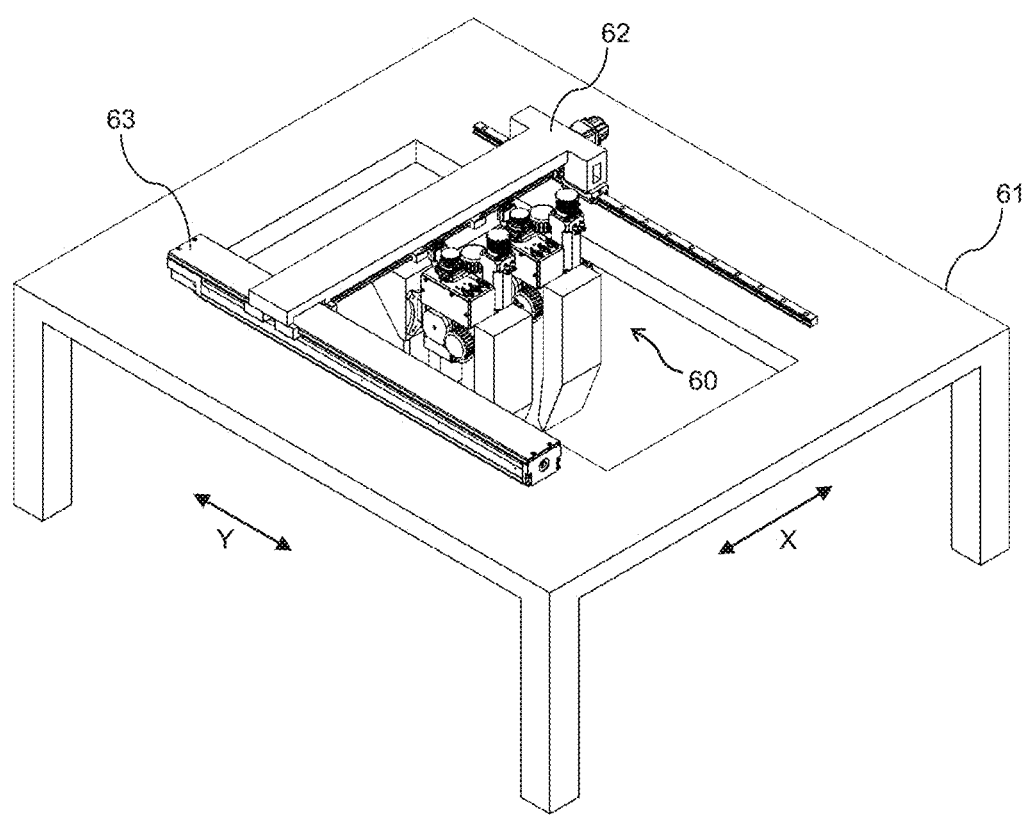
FIG. 24 is a perspective view showing an integration unit 60 and a peripheral portion thereof according to a modified example.

Thirdly, although the first and second galvanometer mirror units 43 and 53 are provided side by side along the arrow Y direction in the above embodiment, the present invention is not limited thereto. For example, they may be provided side by side along the arrow X direction as shown in FIG. 24. In such cases, it should be noted that the inert gas supplying openings 45a, 55a and the fume suction openings 46a, 56a (see FIG. 7) are arranged along the arrow Y direction (the horizontal one-axis direction orthogonal to the direction in which the recoater head 11 horizontally moves) facing to each other. And the chamber supplying opening 1b, the sub supplying opening 1e and the chamber discharging opening 1c are arranged in the chamber 1 such that the direction in which the inert gas supplied from the inert gas supplying openings 45a and 55a flows to the fume suction openings 46a and 56a along to the arrow Y direction is the same as the flow direction of the other inert gas in chamber 1.

Fourthly, although the inert gas supplying openings 45a, 55a and the fume suction openings 46a and 56a are arranged with facing to each other along the horizontal one-axis direction orthogonal to the horizontal one-axis direction in which the first and second galvanometer mirror units 43, 53 are arranged in the above-described embodiment, but the present invention is not limited thereto. For example, the inert gas supplying openings 45a, 55a and the fume suction openings 46a, 56a are arranged with facing to each other along the same direction as the horizontal one axis direction in which the first and second galvanometer mirror units 43, 53 are arranged.

Fifthly, in the above-described embodiment, since it is acceptable as long as there is no region that a laser cannot be irradiated between the first large irradiation region S1 and the second large irradiation region S2, the first large irradiation region S1 and the second large irradiation region S2 are arranged adjacent to each other (so as not to have an overlapped predetermined irradiation region S3). However, the first large irradiation region S1 and the second large irradiation region S2 may be overlapped to each other (so as to have the overlapped predetermined irradiation region S3).

Sixthly, the lamination molding apparatus according to the present invention may comprise a processing head having a spindle to which a cutting tool can be attached. In this case, every time sintered layers having predetermined numbers (e.g., 10 layers) are formed, cutting work can be performed on the molded object.

Seventhly, in the lamination molding apparatus according to the present invention, the first and second laser sources 42, 52 and the first and second focus control units 44, 54 are connected via the optical fibers 41, 51. However, including the first and second laser sources 42, 52 in the integration unit 60, the optical system may be set up without the first and second optical fibers 41, 51.

6. Conclusion

The embodiments of the present invention and modifications thereof are described above, they have been presented only as examples and are not intended to limit the scope of the invention. These novel embodiments can be implemented in various other forms and various omissions, substitutions, and changes can be made without departing from the gist of the invention. These embodiments and modifications thereof are included in the scope and gist of the invention and are included in the invention described in the claims and the equivalent scope thereof.

What is claimed is:

1. A lamination molding apparatus with a molding table, comprising:
a first galvanometer scanner configured to be capable of irradiating a predetermined first small irradiation region on the molding table with a first laser beam;
a second galvanometer scanner configured to be capable of irradiating a predetermined second small irradiation region on the molding table with a second laser beam;
first inert gas supplying nozzle having first inert gas supplying opening for supplying an inert gas;
a second inert gas supplying nozzle having a second inert gas supplying opening for supplying an inert gas;
a first fume suction duct having a first fume suction opening for suctioning the inert gas containing fumes generated with irradiation of the first laser beam;
a second fume suction duct having a second fume suction opening for suctioning the inert gas containing fumes generated with irradiation of the second laser beam;
an integration unit integrally including the first galvanometer scanner, the second galvanometer scanner, the first inert gas supplying nozzle, the second inert gas supplying nozzle, the first fume suction duct and the second fume suction duct; and
a moving device configured to move the integration unit so that the first galvanometer scanner scans and irradiates the first laser beam on a predetermined first large irradiation region larger than the predetermined first small irradiation region on the molding table, and the second galvanometer scanner scans and irradiates the second laser beam on a predetermined second large irradiation region larger than the predetermined second small irradiation region on the molding table;
wherein the first inert gas supplying opening and the first fume suction opening are provided to be opposed to each other so that an irradiation path of the first laser beam is placed therebetween and
the second inert gas supplying opening and the second fume suction opening are provided to be opposed to each other so that an irradiation path of the second laser beam is placed therebetween.

2. The lamination molding apparatus of claim 1,
wherein the first inert gas supplying nozzle and the first fume suction duct are arranged so as not to interfere with the first laser beam scanned by the first galvanometer scanner, and
the second inert gas supplying nozzle and the second fume suction duct are arranged so as not to interfere with the second laser beam scanned by the second galvanometer scanner.

3. The lamination molding apparatus of claim 1,
wherein the first inert gas supplying opening and the first fume suction opening are arranged so as to be adjacent to the first galvanometer scanner
and the second inert gas supplying opening and the second fume suction opening are arranged so as to be adjacent to the second galvanometer scanner.

4. The lamination molding apparatus of claim 1,
wherein, the predetermined first small irradiation region is a maximum area that the first galvanometer scanner can scan and irradiate the first laser beam in a state that the moving apparatus is not moving the integration unit, or an area contained in the maximum area, and
the predetermined second small irradiation region is a maximum area that the second galvanometer scanner can scan and irradiate the second laser beam in the state that the moving apparatus is not moving the integration unit, or the area contained in the maximum area.

5. The lamination molding apparatus of claim 1,
wherein the predetermined first large irradiation region and the predetermined second large irradiation region overlap or adjoin each other.

6. The lamination molding apparatus of claim 1, further comprising
a recoater head that reciprocates in a horizontal one-axis direction and flatten metal powder of material while spreading the metal powder,
wherein the first inert gas supplying opening is arranged such that the inert gas is supplied to the predetermined first small irradiation region along the horizontal one-axis direction or a direction perpendicular thereto,
the second inert gas supplying opening is arranged such that the inert gas is supplied to the predetermined second small irradiation region along the horizontal one-axis direction or the direction perpendicular thereto,
the first fume suction opening is arranged such that the fume generated with irradiation of the first laser beam is suctioned from the predetermined first small irradiation region along the horizontal one-axis direction or the direction perpendicular thereto and
the second fume suction opening is arranged such that the fume generated with irradiation of the second laser beam is suctioned from the predetermined second small irradiation region along the horizontal one-axis direction or the direction perpendicular thereto.

7. The lamination molding apparatus of claim 1,
wherein the moving device moves the integration unit at each time after the first galvanometer scanner scans and irradiates the first laser beam within the predetermined first small irradiation region, so that the first galvanometer scanner scans and irradiates the first laser beam within the predetermined first large irradiation region, and moves the integration unit at each time after the second galvanometer scanner scans and irradiates the second laser beam within the predetermined second small irradiation region, so that the second galvanometer scanner scans and irradiates the second laser beam within the predetermined second large irradiation region.

8. The lamination molding apparatus of claim 1,
wherein the moving device moves the integration unit while the first galvanometer scanner scans and irradiates the first laser beam within the predetermined first small irradiation region, so that the first galvanometer scanner scans and irradiates the first laser beam within the predetermined first large irradiation region, and moves the integration unit while the second galvanometer scanner scans and irradiates the second laser beam within the predetermined second small irradiation region, so that the second galvanometer scanner scans and irradiates the second laser beam within the predetermined second large irradiation region.

9. The lamination molding apparatus of claim 1, further comprising:
a chamber that covers the molding table and is filled with an inert gas;
a chamber supplying opening that supplies the inert gas into the chamber; and
a chamber discharging opening that discharges the inert gas including the fume generated with irradiation of the first laser beam or the second laser beam from the chamber;

wherein the first inert gas supplying opening and the first fume suction opening are directed to a direction identical to a flow direction of the inert gas flowing from the first inert gas supplying opening toward the first fume suction opening, and the second inert gas supplying opening and the second fume suction opening are directed to a direction identical to a flow direction of the inert gas flowing from the second inert gas supplying opening toward the second fume suction opening.

\* \* \* \* \*